(12) United States Patent
Kawakami et al.

(10) Patent No.: US 11,804,030 B2
(45) Date of Patent: Oct. 31, 2023

(54) CELL IMAGE ANALYSIS METHOD, CELL IMAGE ANALYSIS APPARATUS, PROGRAM, AND CELL IMAGE ANALYSIS SYSTEM

(71) Applicant: SYSMEX CORPORATION, Kobe (JP)

(72) Inventors: Hajimu Kawakami, Kobe (JP); Hirokazu Kurata, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 0 days.

(21) Appl. No.: 17/697,977

(22) Filed: Mar. 18, 2022

(65) Prior Publication Data

US 2022/0207894 A1    Jun. 30, 2022

Related U.S. Application Data

(63) Continuation of application No. 17/016,770, filed on Sep. 10, 2020, now Pat. No. 11,354,529.

(30) Foreign Application Priority Data

Sep. 13, 2019    (JP) .................................. 2019-167340

(51) Int. Cl.
  *G06V 20/69*    (2022.01)
  *G06V 10/764*   (2022.01)
  *G06V 10/94*    (2022.01)
(52) U.S. Cl.
  CPC .......... *G06V 10/764* (2022.01); *G06V 10/945* (2022.01); *G06V 20/69* (2022.01); *G06V 20/693* (2022.01); *G06V 20/695* (2022.01); *G06V 20/698* (2022.01)

(58) Field of Classification Search
  CPC .. G06V 10/764; G06V 20/695; G06V 20/698; G06V 10/945
  See application file for complete search history.

(56) References Cited

U.S. PATENT DOCUMENTS

| 2008/0212866 A1* | 9/2008 | Lett ..................... G01N 21/6458 |
| | | 382/133 |
| 2010/0169811 A1* | 7/2010 | Yamada ........... G01N 35/00871 |
| | | 715/764 |

FOREIGN PATENT DOCUMENTS

| JP | 2010-512508 A | 4/2010 |
| JP | 2010-151647 A | 7/2010 |
| JP | 2016-511419 A | 4/2016 |
| JP | 2019-144262 A | 8/2019 |

OTHER PUBLICATIONS

The Communication pursuant to Article 94(3) EPC dated Feb. 9, 2023 in a counterpart European patent application.
Japanese Office Action dated Aug. 14, 2023 in a counterpart Japanese patent application.

* cited by examiner

*Primary Examiner* — Sam Bhattacharya
(74) *Attorney, Agent, or Firm* — METROLEX IP LAW GROUP, PLLC

(57) ABSTRACT

A cell image analysis method may include: obtaining, for each of cell images, a value of a feature parameter to be used in determination of a type of a cell, by analyzing the cell images; and displaying the value of the feature parameter in association with the each of the cell images.

19 Claims, 16 Drawing Sheets

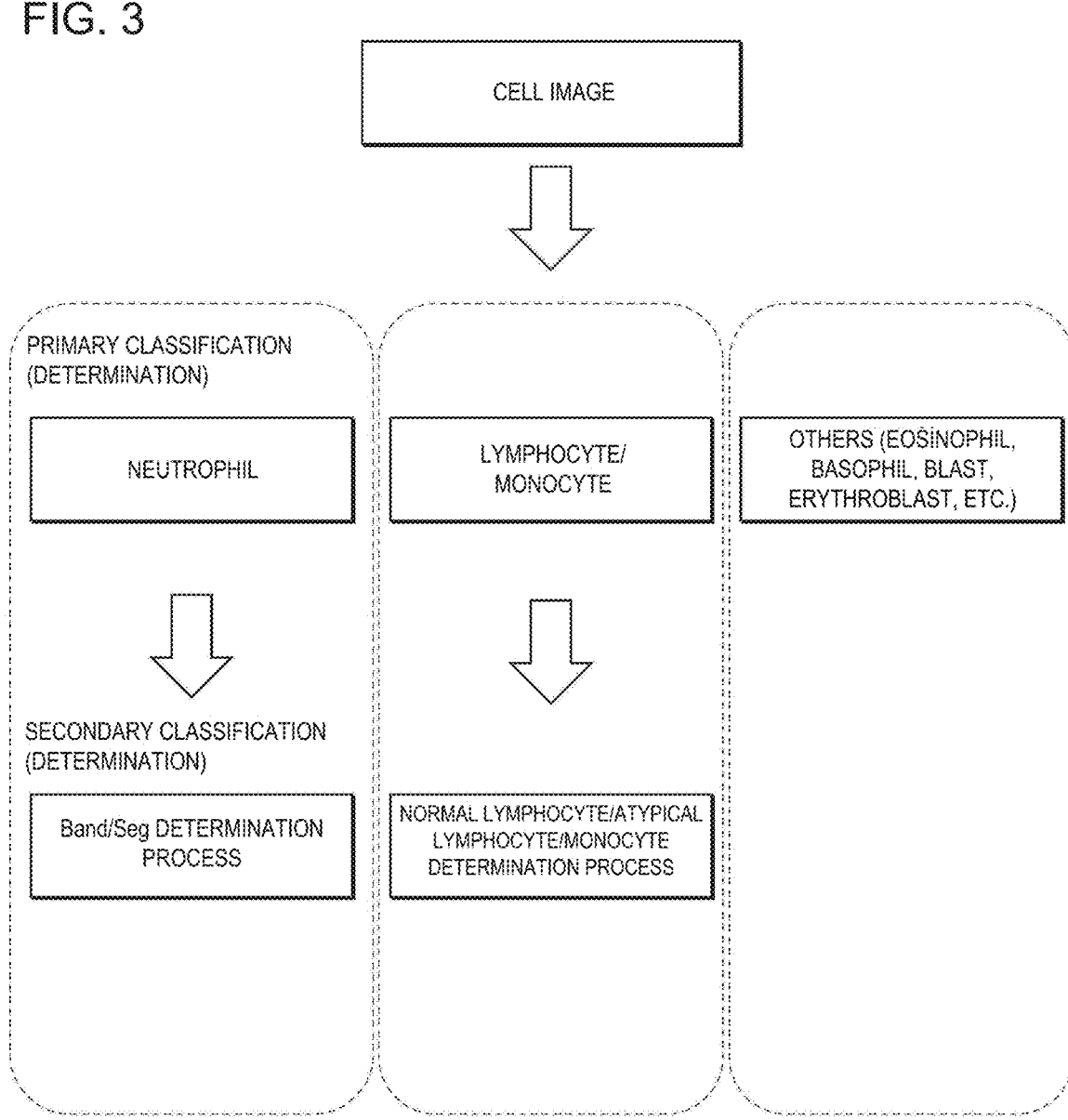

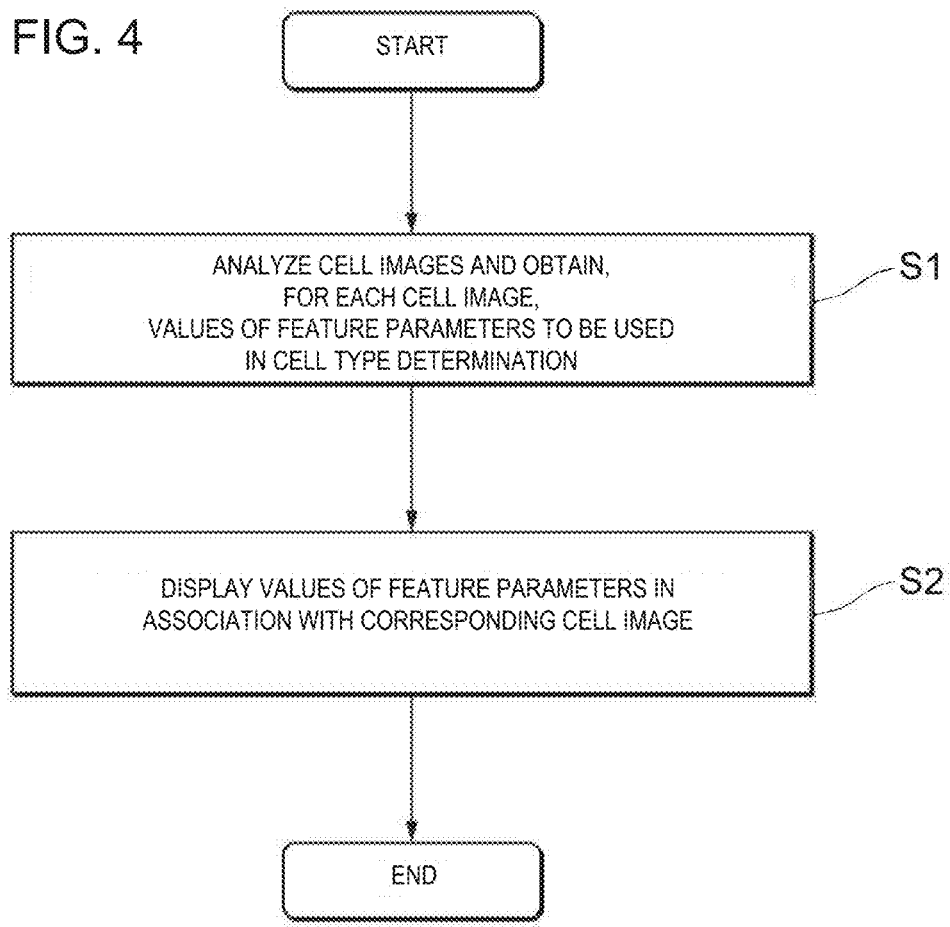

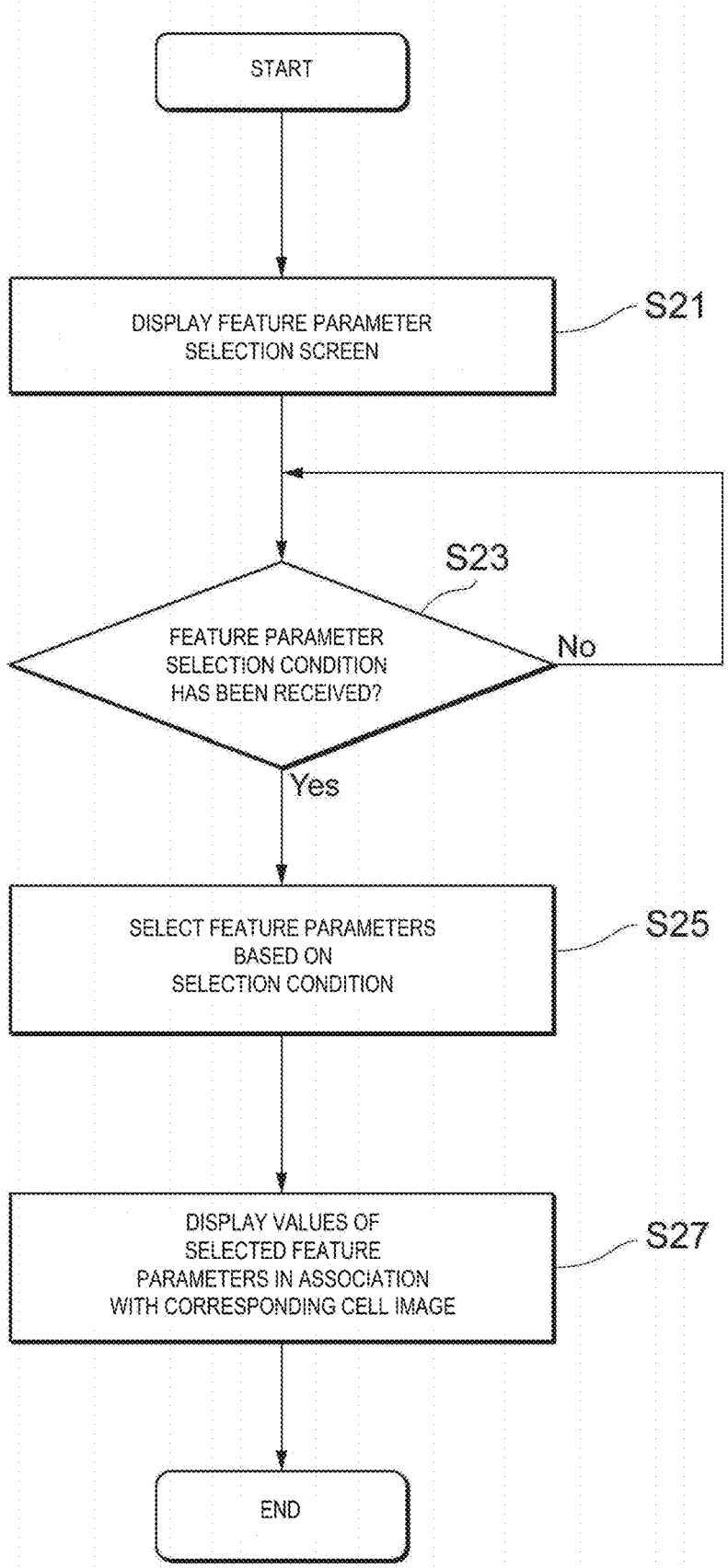

FIG. 10A

SELECT PARAMETER(S) — SS1

- ☐ DIAMETER OF CELL {cell diameter}
- ☐ NUCLEAR-CYTOPLASMIC RATIO {N/C ratio}
- ☐ HULL RATIO OF NUCLEUS {nuclear hull ratio}
- ☐ BLUENESS (MEAN SATURATION) OF NUCLEUS {mean nuclear saturation}
- ☐ COMPLEXITY OF NUCLEUS {nuclear dissimilarity}
- ☐ NUMBER OF NUCLEOLI {nucleolus}
- ☐ BLUENESS (SATURATION) OF CYTOPLASM {mean cytoplasmic saturation}
- ☐ COLOR UNEVENNESS (COLOR TONE UNEVENNESS) OF CYTOPLASM {cytoplasmic unevenness}
- ☐ PRIMARY GRANULES IN CYTOPLASM {primary granules}
- ☐ SECONDARY GRANULES IN CYTOPLASM {secondary granules}
- ☐ POISONING GRANULES IN CYTOPLASM {poisoning granules}
- ☐ NUMBER OF VACUOLES IN CYTOPLASM {cytoplasmic vacuoles}
- ☐ MAXIMUM WIDTH OF NUCLEUS (Max)   — CB1
- ☑ MINIMUM WIDTH OF NUCLEUS (min)   — CB3
- ☑ min/Max RATIO (min/Max ratio)    — CB5
- ☑ OVERLAP OF NUCLEI {nuclear overlap}

[ OK ] B1    [ CANCEL ] B3

FIG. 10B

SELECT PARAMETER(S) — SS3

- ☐ DIAMETER OF CELL {cell diameter}
- ☐ NUCLEAR-CYTOPLASMIC RATIO {N/C ratio}
- ☐ HULL RATIO OF NUCLEUS {nuclear hull ratio}
- ☐ BLUENESS (MEAN SATURATION) OF NUCLEUS {mean nuclear saturation}
- ☐ COMPLEXITY OF NUCLEUS {nuclear dissimilarity}
- ☐ NUMBER OF NUCLEOLI {nucleolus}
- ☐ BLUENESS (SATURATION) OF CYTOPLASM {mean cytoplasmic saturation}
- ☐ COLOR UNEVENNESS (COLOR TONE UNEVENNESS) OF CYTOPLASM {cytoplasmic unevenness}
- ☐ PRIMARY GRANULES IN CYTOPLASM {primary granules}
- ☐ SECONDARY GRANULES IN CYTOPLASM {secondary granules}
- ☐ POISONING GRANULES IN CYTOPLASM {poisoning granules}
- ☐ NUMBER OF VACUOLES IN CYTOPLASM {cytoplasmic vacuoles}
- ☐ MAXIMUM WIDTH OF NUCLEUS (Max)   — CB1
- ☑ MINIMUM WIDTH OF NUCLEUS (min)   — CB3
- ☑ min/Max RATIO (min/Max ratio)    — CB5
- ☐ OVERLAP OF NUCLEI {nuclear overlap}

[ OK ] B1    [ CANCEL ] B3

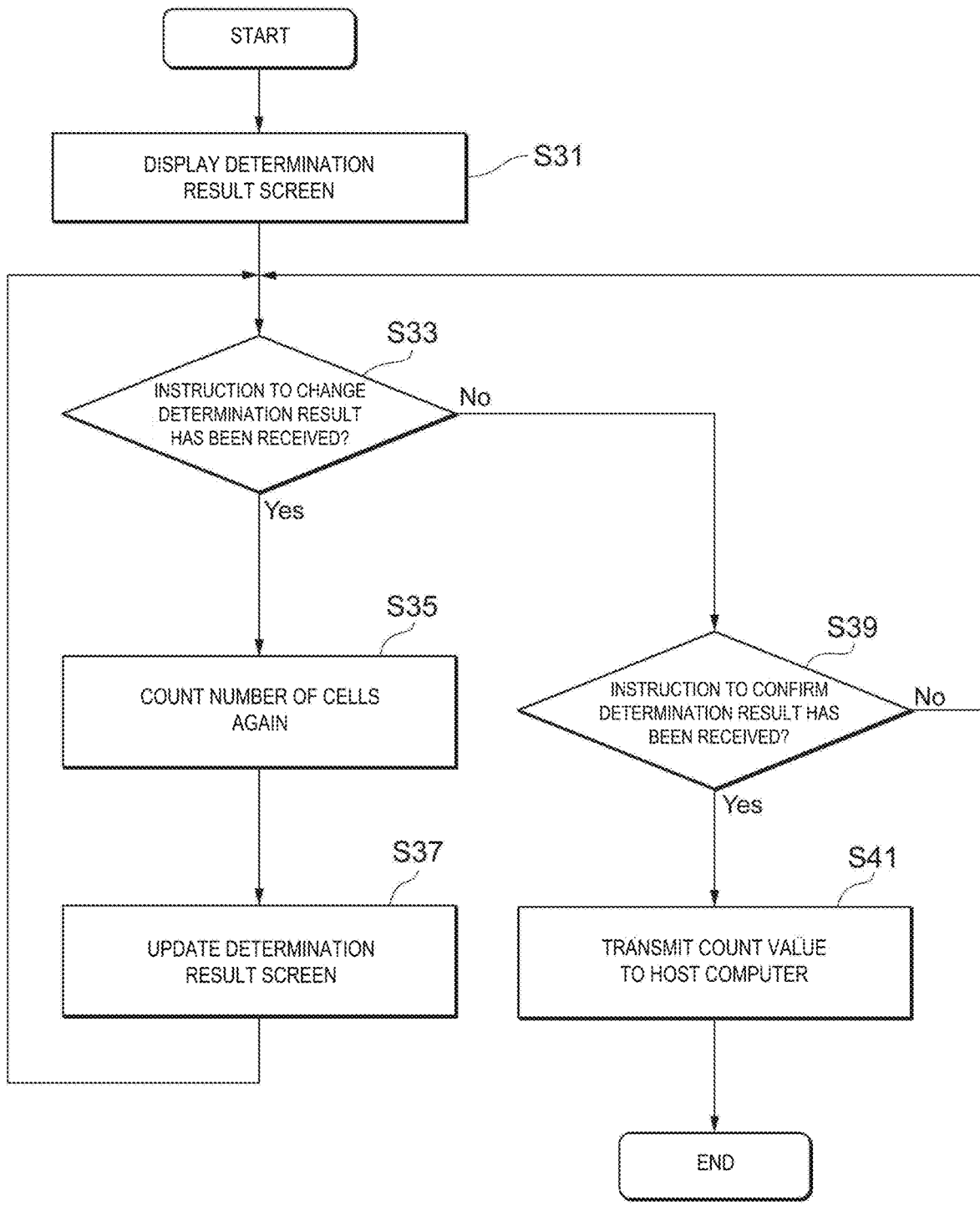

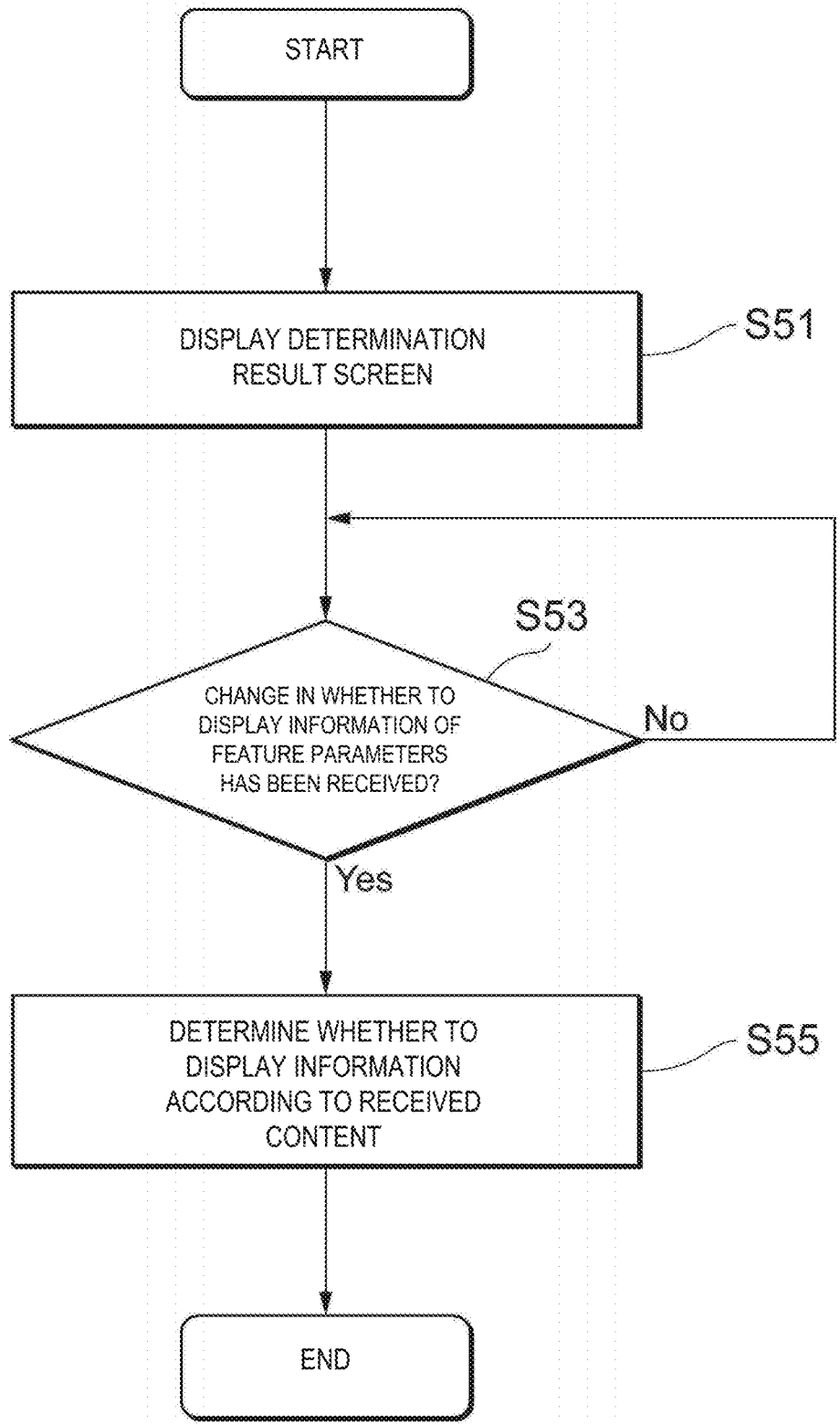

CELL IMAGE ANALYSIS METHOD, CELL IMAGE ANALYSIS APPARATUS, PROGRAM, AND CELL IMAGE ANALYSIS SYSTEM

CROSS REFERENCE TO RELATED APPLICATIONS

This application is a continuation of application Ser. No. 17/016,770, filed on Sep. 10, 2020, which is based upon and claims the benefit of priority from the prior Japanese Patent Application No. 2019-167340, filed on Sep. 13, 2019, the entire contents of all of which are incorporated herein by reference.

BACKGROUND

The disclosure relates to a cell image analysis method, a cell image analysis apparatus, a program, and a cell image analysis system.

Published Japanese Translation of PCT International Application No. 2014-520266 ("Patent Literature 1") discloses a system for displaying images of cells in a specimen. This system obtains cell images each corresponding to a single cell in a specimen, measures the value of at least one property of each cell (such as the amount of hemoglobin in the cell, the volume of the cell, the size of the cell, the optical density, or the shape of the cell) based on the obtained cell images, and sorts the cell images based on the measured values of the property.

Here, it is desirable that examiners such as clinical laboratory technicians and physicians accurately determine the types of cells included in as many as hundreds of cell images displayed on a conventional cell image display system as disclosed in Patent Literature 1. In order to accurately determine the type of the cell included in each cell image, an examiner needs to check feature parameters such as the diameter of the cell, the nuclear-cytoplasmic ratio, the hull ratio of the nucleus, the blueness of the nucleus, and the complexity of the nucleus, and objectively determine the type of the cell based on the feature parameters.

With a conventional cell image display system as disclosed in Patent Literature 1, however, an examiner views cell images and determines the types of the cells based on experience, Thus, it is difficult particularly for an inexperienced examiner to make an accurate type determination.

One or more aspects have been made in view of the above circumstance, and an object thereof is to provide a cell image analysis method, a cell image analysis apparatus, a program, and a cell image analysis system that assist an examiner in accurately determining the types of cells.

SUMMARY

A cell image analysis method according one or more aspects may include: obtaining, for each of cell images, a value of a feature parameter to be used in determination of a type of a cell, by analyzing the cell images; and displaying the value of the feature parameter in association with the each of the cell images.

A cell image analysis apparatus according one or more aspects may include: an analyzer that analyzes cell images and obtains, for each of the cell images, a value of a feature parameter to be used in determination of a type of a cell; and a display part that displays the value of the feature parameter in association with the each of the cell images.

A non-transitory computer-readable storage medium, according one or more aspects, storing a program, which when read and executed, causes a computer apparatus to perform operations may include: operation as an analyzer that analyzes cell images and obtains, for each of the cell images, a value of a feature parameter to be used in determination of a type of a cell; and operation as a display part that displays the value of the feature parameter in association with the each of the cell images.

A cell image analysis system according one or more aspects may include: a cell image capturing apparatus that captures an image of cells and obtains cell images; and a cell image analysis apparatus that analyzes the cell images. The cell image capturing apparatus may include: an image capturing part that captures the image of the cells and obtains the cell images; and a first communication part that transmits the obtained cell images to the cell image analysis apparatus. The cell image analysis apparatus may include: a second communication part that receives the cell images transmitted from the cell image capturing apparatus; an analyzer that analyzes the received cell images and obtains, for each of the cell images, a value of a feature parameter to be used in determination of a type of a cell in each of the cell images; and a display part that displays the value of the feature parameter in association with the each of the cell images.

BRIEF DESCRIPTION OF DRAWINGS

FIG. 3 is a diagram illustrating an example of a cell type determination process according to an embodiment;

FIG. 4 is a flow diagram illustrating a cell image analysis process according to an embodiment;

FIG. 9 is a flow diagram illustrating a cell feature parameter election process according to an embodiment;

FIGS. 10A and 10B are diagrams illustrating an example of a cell feature parameter selection screen on a display part of a cell image analysis apparatus according to an embodiment;

FIG. 12 is a flow diagram illustrating a cell type determination result changing process according to an embodiment;

FIG. 14 is a flow diagram illustrating a cell feature parameter display control process according to an embodiment;

DETAILED DESCRIPTION

Figure 1:
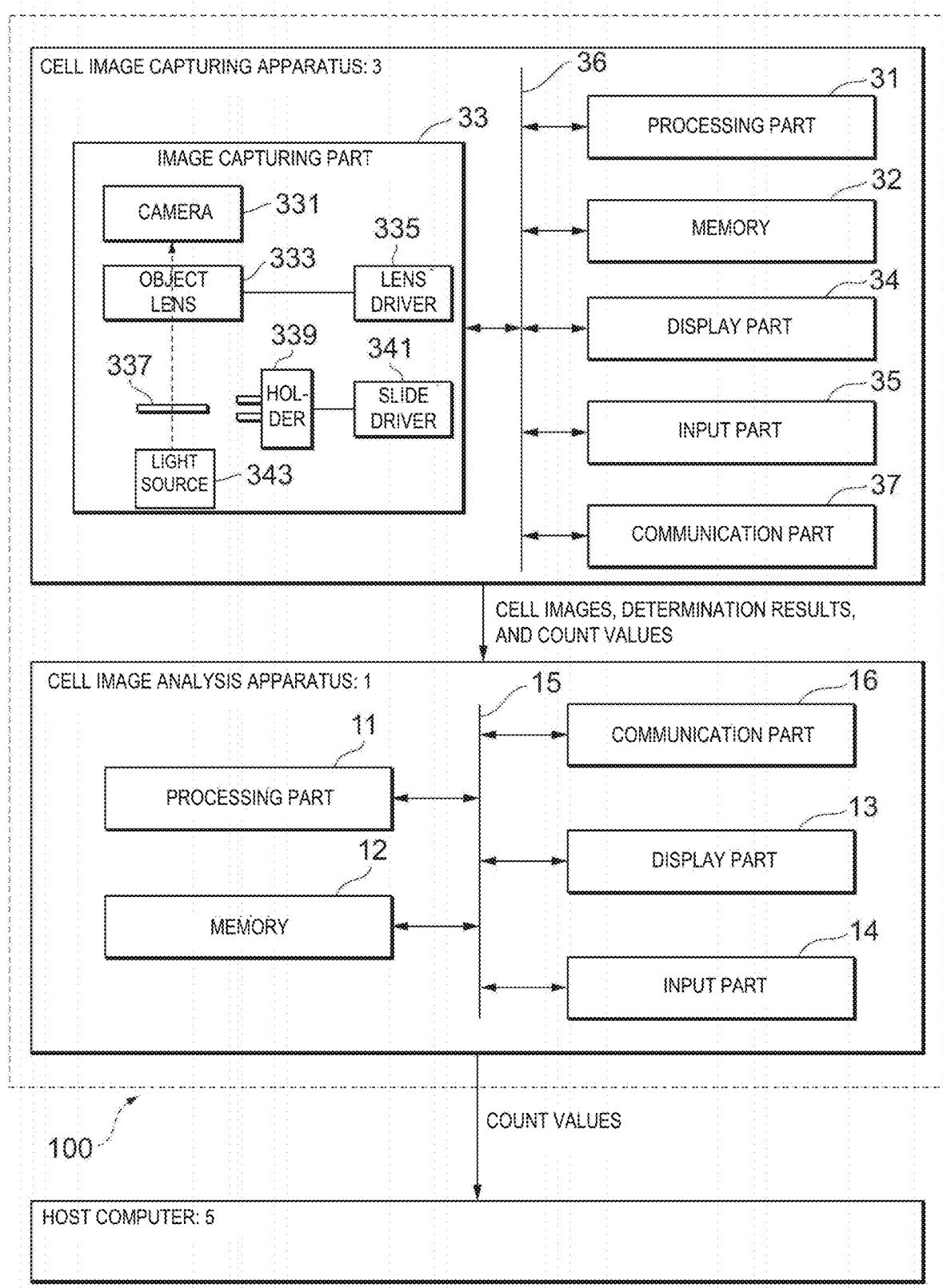
FIG. 1 is a diagram illustrating an example of the configuration of a cell image analysis system according to an embodiment.

A cell image analysis method according to an aspect includes: analyzing cell images and obtaining, for each of the cell images, a value of a feature parameter to be used in determination of a type of a cell; and displaying the value of the feature parameter in association with the corresponding cell image.

According to an aspect, the above cell image analysis method includes analyzing cell images, obtaining, for each of the cell images, the value of a feature parameter to be used in determination of the type of a cell, and displaying the value of the feature parameter in association with the each of the cell images. In this way, it is possible to assist an examiner in accurately determining the types of cells.

A cell image analysis apparatus according to an aspect includes: an analyzer that analyzes cell images and obtains, for each of the cell images, a value of a feature parameter to be used in determination of a type of a cell; and a display part that displays the value of the feature parameter in association with the each of the cell images.

According to an aspect, the above cell image analysis apparatus analyzes cell images, obtains, for each of the cell images, the value of a feature parameter to be used in determination of the type of a cell, and displays the value of the feature parameter in association with the corresponding cell image. In this way, it is possible to assist an examiner in accurately determining the types of cells.

A program according to an aspect causes a computer apparatus to function as: an analyzer that analyzes cell images and obtains, for each of the cell images, a value of a feature parameter to be used in determination of a type of a cell; and a display part that displays the value of the feature parameter in association with the each of the cell images.

According to an aspect, the above program according causes a computer apparatus to function as: an analyzer that analyzes cell images and obtains, for each of the cell images, the value of a feature parameter to be used in determination of the type of a cell; and a display part that displays the value of the feature parameter in association with the each of the cell images. In this way, it is possible to assist an examiner in accurately determining the types of cells.

A cell image analysis system according to an aspect is a cell image analysis system including: a cell image capturing apparatus that captures an image of cells and obtains cell images; and a cell image analysis apparatus that analyzes the cell images, the cell image capturing apparatus includes an image capturing part that captures an image of cells and obtains the cell images, and a first communication part that transmits the obtained cell images to the cell image analysis apparatus, and the cell image analysis apparatus includes a second communication part that receives the cell images transmitted from the cell image capturing apparatus, an analyzer that analyzes the received cell images and obtains, for each of the cell images, a value of a feature parameter to be used in determination of a type of a cell in the cell image, and a display part that displays the value of the feature parameter in association with the each of the cell images.

According to an aspect, the above cell image analysis system analyzes cell images, obtains, for each of the cell images, the value of a feature parameter to be used in determination of the type of a cell, and displays the value of the feature parameter in association with the corresponding cell image. In this way, it is possible to assist an examiner in accurately determining the types of cells.

According to one or more aspects, it is possible to assist an examiner in accurately determining the types of cells.

Embodiments are explained below with reference to the drawings. Note that identical components are denoted by the same reference sign and overlapping description is omitted. Also, positional relationships such the upper, lower, left, right, and left sides are based on the positional relationships illustrated in the drawings unless otherwise noted. Further, the dimensional ratios in the drawings are not limited to the illustrated ratios. Furthermore, the following embodiments are examples for explaining the present invention, and the present invention is not limited to these embodiments.

FIG. 1 is a diagram illustrating an example of the configuration of a cell image analysis system according to an embodiment. As illustrated in FIG. 1, a cell image analysis system 100 includes a cell image analysis apparatus 1 and a cell image capturing apparatus 3.

First, an overview of the cell image analysis system 100 is explained below. The cell image capturing apparatus 3 captures an image of a blood sample collected from a subject, analyzes cell images, obtains, for each cell, the values of feature parameters to be used in cell type determination, determines the type of each cell, and counts the cells by type. The cell image capturing apparatus 3 transmits the cell images and the analysis results (the determination results obtained by determining the types of the cells and the count values each being the number of cells) to the cell image analysis apparatus 1. The cell image analysis apparatus 1 analyzes the cell images received from the cell image capturing apparatus 3, obtains, for each cell image, the values of feature parameters to be used in cell type determination, determines the type of each cell, and counts the cells by type. The cell image analysis apparatus 1 displays the information of the feature parameters in association with the corresponding cell image, and receives a change made to the cell type by the user. Among the analysis results (the determination results obtained by determining the types of the cells and the count values each being the number of cells), the cell image analysis apparatus 1 transmits only the count values to a host computer 5. The host computer 5 manages the pieces of information received from the cell image analysis apparatus 1.

The cell image capturing apparatus 3 includes, as its hardware components; an image capturing part 33 that obtains cell images; a processing part 31 that controls the operation of the image capturing part 33 and analyzes the cell images; a memory 32 that stores the results of the analyses by the processing part 31 and the cell images; a display part 34 that includes a display or the like and displays the analysis results; an input part 35 including a mouse, a keyboard, a touchscreen device, and/or the like; and a communication part 37 that receives and transmits data from and to external equipment. The processing part 31 includes a processor (CPU). The memory 32 includes a readable-writable memory (RAM) to be used as a work area for various processes by the processing part 31, a read-only memory (ROM) that stores computer programs and information, a hard disk drive, and so on. The processing part 31 and the memory 32 can be configured using a general-purpose computer. The hard disk drive may be included in the computer or provided as a device outside the computer. The processing part 31 transmits and receives control signals, various pieces of information, and the like to and from the image capturing part 33, the memory 32, the display part 34, and the input part 35 via a bus 36. The communication part 37 transmits the cell images and the analysis results (the determination results obtained by determining the types of the cells and the count values each being the numbers of cells) to the cell image analysis apparatus 1.

The image capturing part 33 includes a camera 331, an object lens 333, a lens driver 335, a smear slide 337, a holder 339, a slide driver 341, and a light source 343. In the image capturing part 33, using the holder 339, the slide driver 341 holds and transports the smear slide 337 being a glass slide with blood applied onto it and stained, and positions the smear slide 337 under the object lens 333. The lens driver 335 drives the object lens to perform automatic focus adjustment relative to the smear slide 337. The camera 331 captures an image of the smear slide 337 illuminated by the light source 343 and obtains image data of cell images. The obtained image data of the cell images is transmitted to and stored in the memory 32.

Figure 2A:
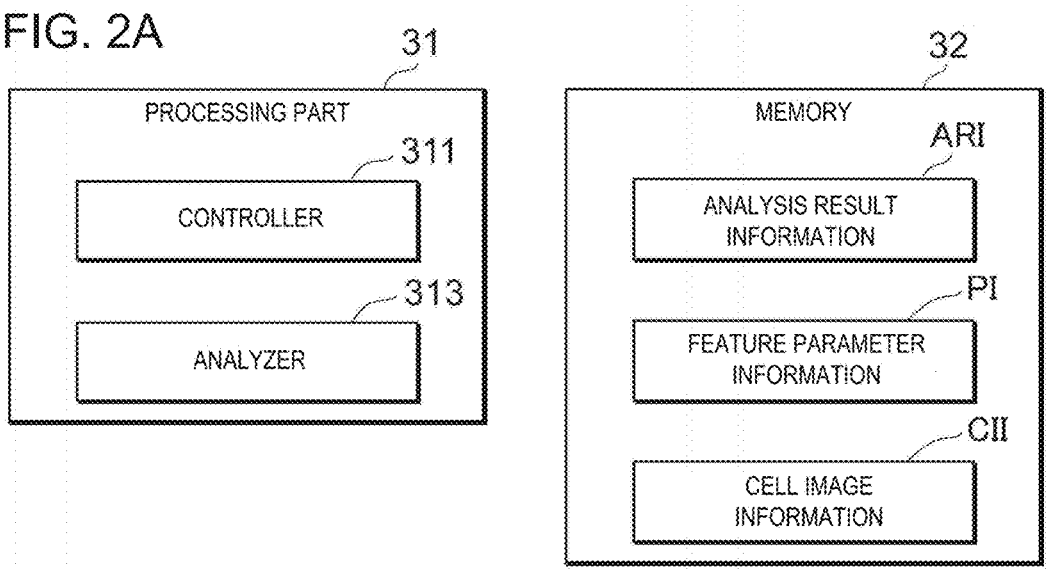
FIGS. 2A and 2B are diagrams illustrating functional configurations of processing parts and memories in a cell image capturing apparatus and a cell image analysis apparatus according to an embodiment.

FIG. 2A is a diagram illustrating a functional configuration of each of the processing part 31 and the memory 32 in the cell image capturing apparatus 3 according to an embodiment. As illustrated in FIG. 2A, the processing part 31 includes a controller 311 that controls the operation of the image capturing part 33, and an analyzer 313 that analyzes cell images. The processing part 31 implements the functions of the controller 311 and the analyzer 313 by, for example, reading out various computer programs stored in the ROM or the hard disk drive into the RAM and executing them. The memory 32 stores, for example, analysis result information ARI being the results of analyses by the analyzer 313, feature parameter information PI containing the values of feature parameters to be used in cell type determination, and cell image information CII of the cell images.

FIG. 3 is a conceptual diagram explaining an example of a cell type determination process according to an embodiment. As illustrated in FIG. 3, the analyzer 313 of the cell image capturing apparatus 3 illustrated in FIG. 2A executes a primary classification (determination) process and a secondary classification process for further classification. In the primary classification process, the analyzer 313 analyzes cell images to classify the types of the cells included in the cell images into, for example, three groups of "neutrophil", "lymphocyte/monocyte", and "other" immature cells and the like.

A set of first feature parameters used in the primary classification process by the analyzer 313 is as followed, for example.
Diameter of the cell (cell diameter)
Nuclear-cytoplasmic ratio (N/C ratio)
Hull ratio of the nucleus (nuclear hull ratio)
Blueness (mean saturation) of the nucleus (mean nuclear saturation)
Complexity of the nucleus (nuclear dissimilarity)
Number of nucleoli (nucleolus)
Blueness (saturation) of the cytoplasm (mean cytoplasmic saturation)
Color unevenness (color tone unevenness) of the cytoplasm (cytoplasmic unevenness)
Phagosome The analyzer 313 performs an analysis process on the cell images by using a cell identification program stored in the memory 32 to calculate the values of the first feature parameters for each cell image. By comprehensively examining the values of these feature parameters, the analyzer 313 classifies each of the cells (cell images), including the white blood cells, into the group "neutrophil", "lymphocyte/monocyte", or "others".

Then, in the secondary classification process, the analyzer 313 refers to the cell images to classify the types of the cells included in the cell images into more detailed groups than those in the primary classification. For each cell image classified as "neutrophil" in the primary classification, the analyzer 313 executes a Band/Seg determination process for determining whether it is a band neutrophil (Band) or a segmented neutrophil (Seg). Also, for each cell image classified as "lymphocyte/monocyte" in the primary classification, the analyzer 313 executes a normal lymphocyte/atypical lymphocyte/monocyte determination process.

A set of second feature parameters used in the secondary classification process by the analyzer 313 is as followed, for example.
Granules (primary granules) in the cytoplasm (primary granules)
Granules (secondary granules) in the cytoplasm (secondary granules)
Granules (toxic or poisoning granules) in the cytoplasm (toxic or poisoning granules)
Number of vacuoles in the cytoplasm
Maximum width of the nucleus (Max)
Minimum width of the nucleus (min)
min/Max ratio
Overlap of nuclei
Döhle bodies The analyzer 313 performs an analysis process on the cell images classified as "neutrophil" in the primary classification by using a cell identification program stored in the memory 32 to calculate the values of the second feature parameters for each cell image. By comprehensively examining the values of these feature parameters, the analyzer 313 classifies each of the cells (cell images) as Band or Seg, Specifically, the analyzer 313 classifies each of the cells (cell images) as Band or Seg by examining the value of at least one of the feature parameters "maximum width of the nucleus (Max)", the "minimum width of the nucleus (min)", "min/Max ratio", or "overlap of nuclei", such as at least one of the feature parameters: "maximum width of the nucleus (Max)"; the "minimum width of the nucleus (min)"; "min/Max ratio"; and "overlap of nuclei".

The feature parameters are not limited to the first feature parameters and the second feature parameters listed above, and may further include a parameter related to the form of the nucleus, the diameter of the nucleus, or the chromatin structure of the nucleus. As explained above, the feature parameters include at least one of the diameter of the cell, the form of the nucleus of the cell, the diameter of the nucleus, the chromatin structure of the nucleus, the nucleolus of the cell, the color tone of the cytoplasm of the cell, the color tone distribution of the cytoplasm, granules in the cytoplasm, vacuoles in the cytoplasm, Döhle bodies in the cytoplasm, or the nuclear-cytoplasmic ratio of the cell, such as at least one of: the diameter of the cell; the form of the nucleus of the cell; the diameter of the nucleus; the chromatin structure of the nucleus; the nucleolus of the cell; the color tone of the cytoplasm of the cell; the color tone distribution of the cytoplasm; granules in the cytoplasm; vacuoles in the cytoplasm; Döhle bodies in the cytoplasm;

and the nuclear-cytoplasmic ratio of the cell. Thus, the examiner can select desired feature parameters from various feature parameters.

Referring back to FIG. 1, the cell image analysis apparatus 1 includes, as its hardware components, a processing part 11, a memory 12, a display part 13, an input part 14, and a communication part 16 that receives and transmits data from and to external equipment. The processing part 11 includes a processor (CPU). The memory 12 includes a readable-writable memory (RAM) to be used as a work area for various processes by the processing part 11, a read-only memory (ROM) that stores computer programs and data, a hard disk drive, and so on. The processing part 11 and the memory 12 can be configured using a general-purpose computer. The hard disk drive may be included in the computer or provided as a device outside the computer. The display part 13 includes a display, for example. The input part 14 includes a mouse, a keyboard, a touchscreen device, and/or the like, for example. The processing part 11 transmits and receives various pieces of information to and from the memory 12, the display part 13, and the input part 14 via a bus 15. The communication part 16 receives cell images and analysis results (determination results obtained by determining the types of the cells and count values each being the numbers of cells) from the cell image capturing apparatus 3 and transmits the count values to the host computer 5.

Figure 2B:
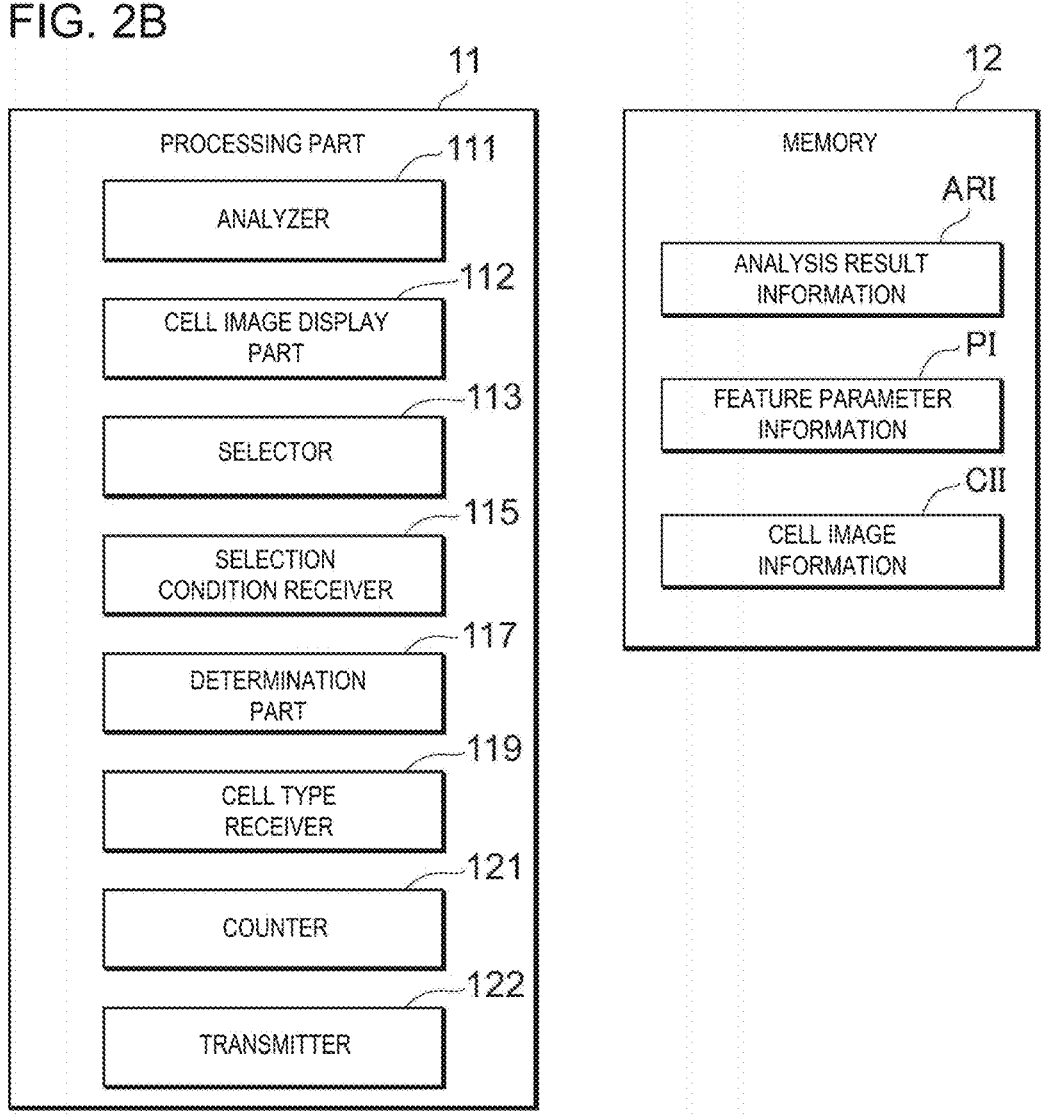

FIG. 2B is a diagram illustrating a functional configuration of each of the processing part 11 and the memory 12 in the cell image analysis apparatus 1 according to an embodiment. The processing part 11 includes: an analyzer 111 that analyzes cell images, obtains, for each cell image, the information of feature parameters to be used in cell type determination, and determines the type of each cell, a cell image display part 112 that causes the display part 13 to display a cell image; a selector 113 that selects feature parameters from among the parameters of cells; a selection condition receiver 115 that receives a selection condition for the feature parameters; a determination part 117 that determines whether to display the information of the feature parameters based on an instruction from an examiner (e.g., a clinical laboratory technician or a physician) who is the user; a cell type receiver 119 that receives an input of the type of the cell included in the displayed cell image; a counter 121 that counts the number of cells by cell type; and a transmitter 122 that transmits various pieces of information to an external apparatus such as the host computer 5 illustrated in FIG. 1. Details of the above functions are explained later. The processing part 11 implements the functions of the analyzer 111, the cell image display part 112, the selector 113, the selection condition receiver 115, the determination part 117, the cell type receiver 119, the counter 121, and the transmitter 122 by, for example, reading out various computer programs stored in the ROM or the hard disk drive into the RAM and executing them.

The memory 12 stores, for example, analysis result information ARI being the results of analyses by the analyzer 111, feature parameter information PI on the feature parameters obtained by the analyses by the analyzer 111, and the cell image information CII on the cell images transmitted from the cell image capturing apparatus 3.

The analyzer 111, like the analyzer 313 of the cell image capturing apparatus 3, executes the primary classification (determination) process and the secondary classification process for further classification illustrated in FIG. 3. The flow of and the feature parameters used in the primary classification (determination) process and the secondary classification process are similar to those with the analyzer 313, and explanation thereof is therefore omitted.

Hereinbelow, an overview of a cell image analysis method executed by a computer program stored in the cell image analysis apparatus 1 is explained with reference to FIG. 4. Note that this computer program is stored in the memory 12 illustrated in FIG. 1 in advance, but may be installed from a portable computer-readable storage medium, such as a CD-ROM, for example, or may be downloaded from, for example, an external server via a network and installed. Note that this applies to flowcharts illustrated in FIGS. 5, 9, 12 and 14 each explaining an example of information processing.

(Step S1)

The analyzer 111 of the cell image analysis apparatus 1 analyzes cell images and obtains, for each cell image, the values of the feature parameters to be used in cell type determination.

(Step S2)

The cell image display part 112 of the cell image analysis apparatus 1 causes the display part 13 to display the values of the feature parameters in association with the corresponding cell image.

Next, details of the cell image analysis method executed by the computer program stored in the cell image analysis apparatus 1 are explained with reference to FIGS. 5 to 15.

(Analysis Process)

Figure 5:
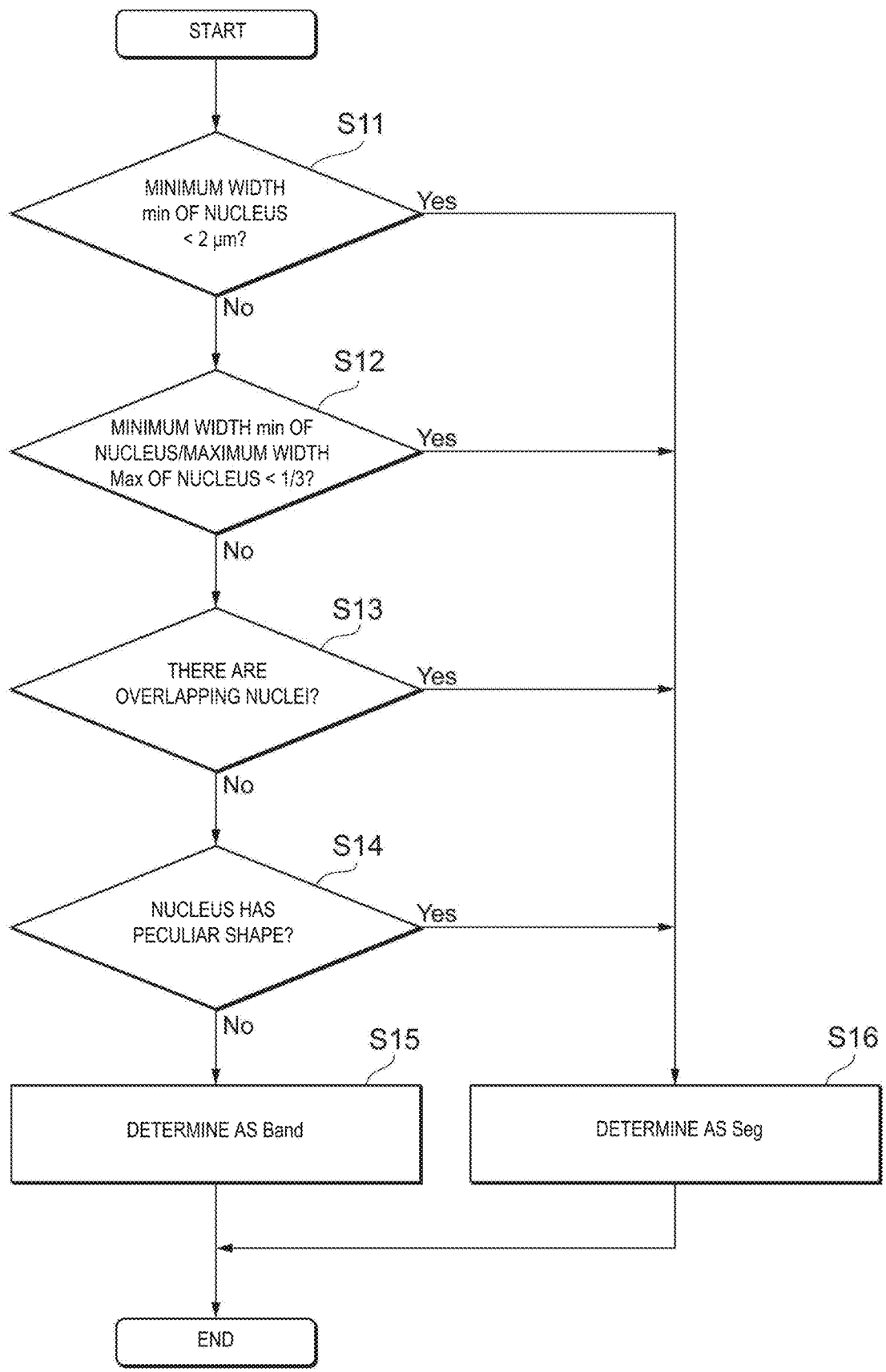
FIG. 5 is a flow diagram illustrating a cell type determination process according to an embodiment.
Figure 6:
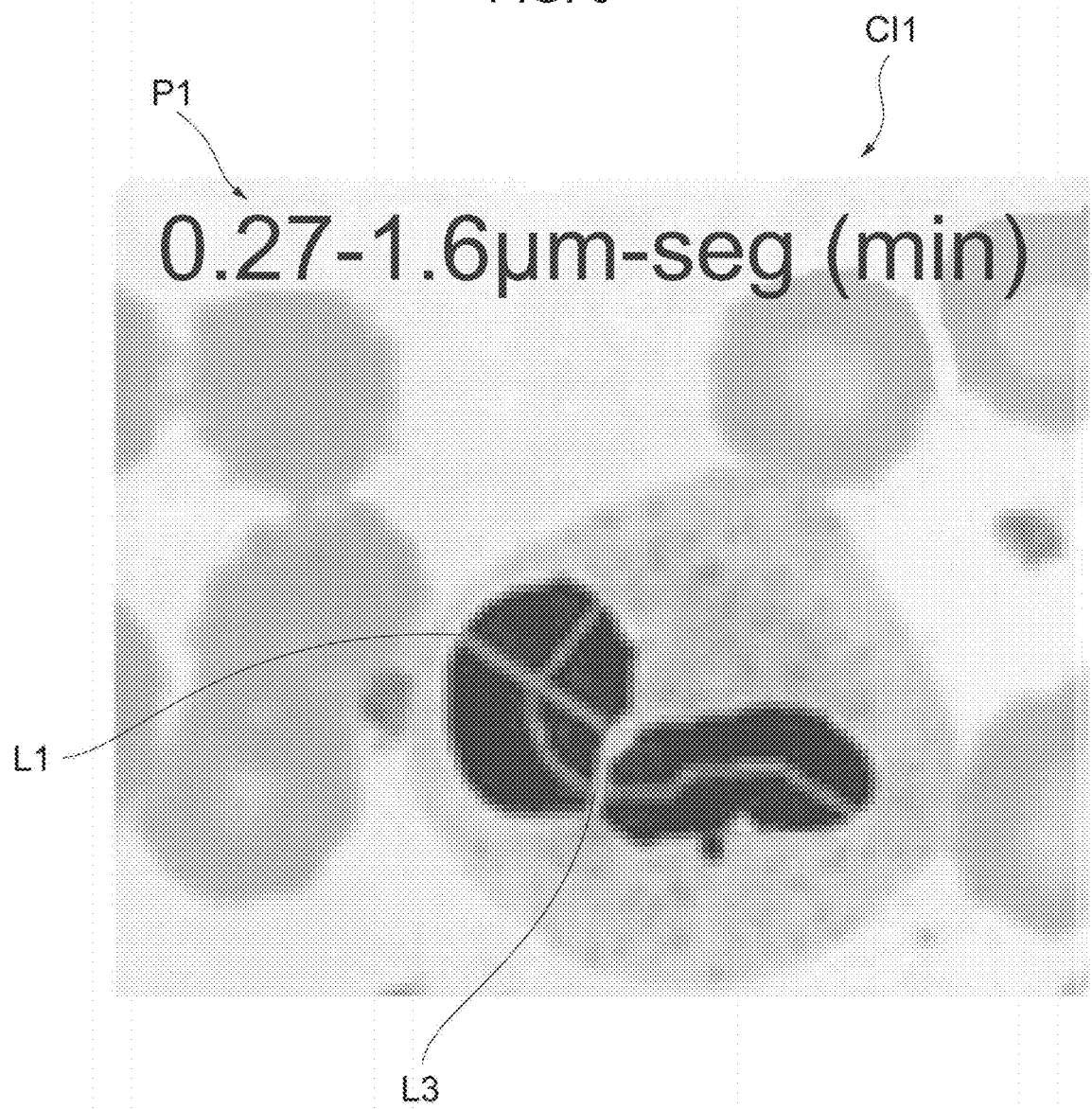
FIG. 6 is a diagram illustrating an example of a cell image including values of feature parameters of a cell according to an embodiment.

The cell type determination process is specifically explained with reference to FIGS. 5 and 6. FIG. 5 is a flowchart explaining part of the cell type determination process according to an embodiment. FIG. 6 is a diagram explaining an example of a cell image including the values of feature parameters of a cell according to an embodiment. More specifically, an explanation is given of an example of executing a process of determining in the secondary classification whether a cell image classified as "neutrophil" in the primary classification is Band or Seg.

In the Band/Seg determination process for a neutrophil, the analyzer 111 of the cell image analysis apparatus 1 makes a determination on one or more conditions necessary for determining the neutrophil as "Seg" in a predetermined order. The analyzer 111 of the cell image analysis apparatus 1 makes a determination with priority on more important conditions, e.g., conditions that enable a Band/Seg determination to be made more accurately and easily such that, as illustrated in FIG. 5, the analyzer 111 of the cell image analysis apparatus 1 checks "the minimum width min of the nucleus is less than 2 μm?" (step S11), "minimum width min of the nucleus/maximum width Max of the nucleus is less than ⅓?" (step S12), "there are overlapping nuclei?" (step S13), and then "the nucleus has a peculiar shape?" (step S14). Then, the analyzer 111 of the cell image analysis apparatus 1 figures out through which step the cell image has been determined as "Seg. In this way, for each cell determined as "Seg" in step S16, it is possible to automatically specify a feature parameter serving as an indicator of the "Seg determination".

Note that the value of the feature parameter (the minimum width min of the nucleus in the above example) based on which the type of the determination target cell ("Seg" in the above example) is determined may be the value of a feature parameter to be displayed in association with the cell image. In this way, the value of a feature parameter that is more relevant to the cell type determination is displayed. This enables the examiner to check and determine the cell type more accurately.

The condition "there are overlapping nuclei" refers to a condition for a case where a cell has multiple nuclei, indicating whether the nuclei overlap each other. Further, the condition "the nucleus has a peculiar shape?" refers to a condition as to whether the nucleus contained in a cell has a peculiar shape such as a loop shape or a trident shape.

For example, in the case of a cell image CI1 illustrated in FIG. 6, a line L1 represents the "maximum width of the nucleus", which is 5.9 µm, and a line L3 represents the "minimum width of the nucleus", which is 1.6 µm. Thus, the "minimum width min of the nucleus/maximum width Max of the nucleus" is 0.27. Since the "minimum width of the nucleus" is 1.6 µm, which is less than 2 µm, a Yes determination is made on the highest-level condition in FIG. 5 "the minimum width min of the nucleus is less than 2 µm?" (step S11). The process then proceeds to step S16, in which the cell image illustrated in FIG. 6 is determined as "Seg". On the other hand, if a No determination is made in all of steps S11 to S14, the process proceeds to step S15, in which the cell image is determined as "Band".

(Display Process)

Figure 7:
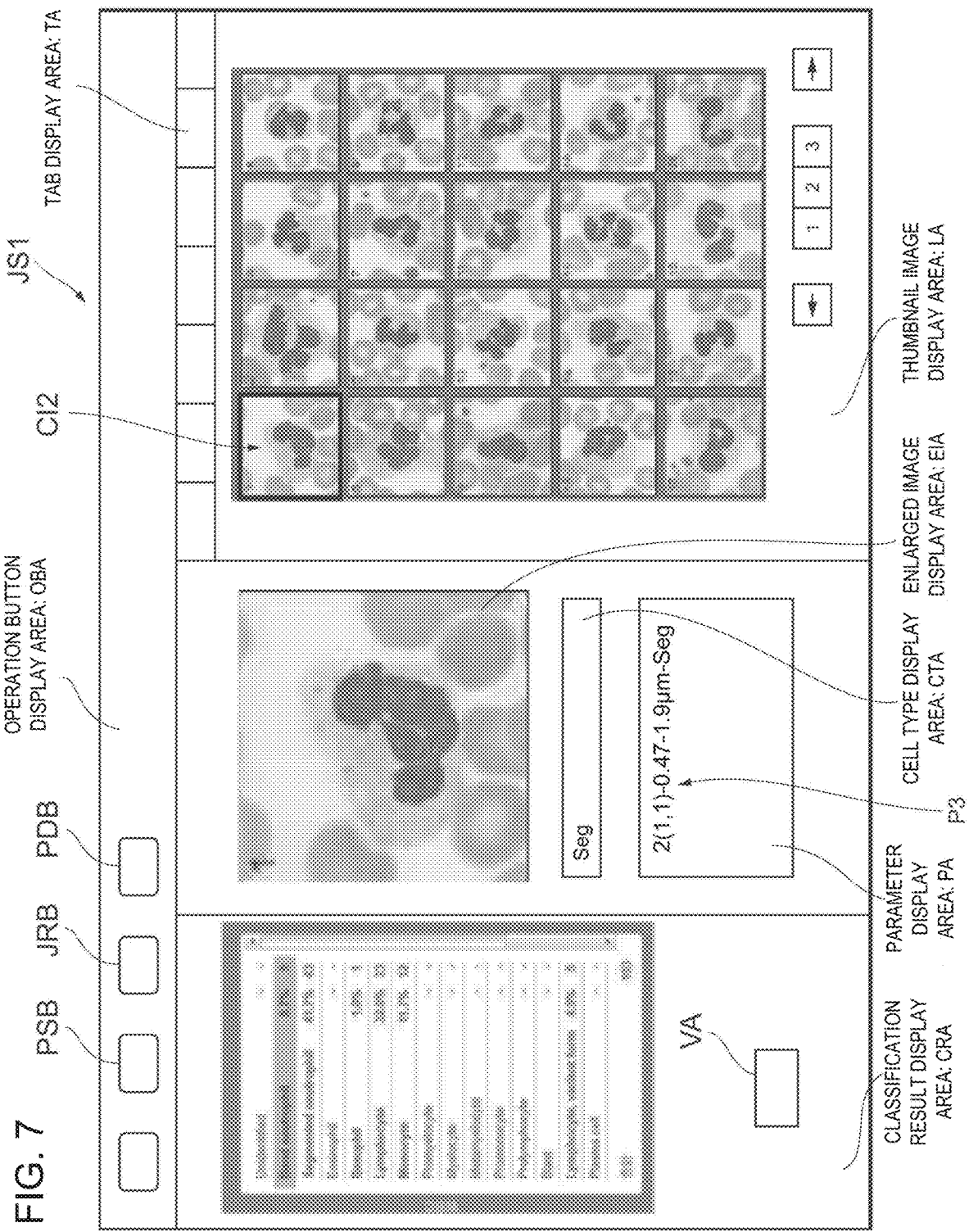
FIG. 7 is a diagram illustrating an example of a cell type determination result screen on a display part of a cell image analysis apparatus according to an embodiment.

FIG. 7 is a diagram illustrating an example of a cell type determination result screen on the display part 13 of the cell image analysis apparatus 1 according to an embodiment. As illustrated in FIG. 7, a determination result screen JS1 includes: a classification result display area CRA including the count value of each cell as the result of the cell classification; a thumbnail image display area LA for arranging and displaying cell images in the form of thumbnails for any one of cell subclasses (such as six subclasses of "neutrophil", "lymphocyte", "monocyte", "eosinophil", "basophil", and "others", for example); and a tab display area TA for causing, for example, cell images under the six subclasses in the thumbnail image display area LA to be displayed in a switchable manner. Note that multiple tabs in the tab display area TA may be selected to switch the cell images. Moreover, by designating subclass names in the classification result display area CRA, e.g., "Band neutrophil" (Band), "Segmented neutrophil" (Seg), etc., the cell images of the cells corresponding to the subclass names designated in the classification result display area CRA may be displayed in the form of thumbnails the thumbnail image display area LA.

The determination result screen JS1 further includes: an enlarged image display area EIA for displaying an enlarged version of, for example, a cell image CI2 designated in the thumbnail image display area LA by the user; a cell type (kind) display area CTA for displaying the name of the subclass of the cell image CI2 determined by the cell image analysis apparatus 1; a parameter display area PA for displaying the feature parameters selected for the cell in the cell image CI2; and an operation button display area OBA in which buttons to be used to perform various operations in the determination result screen are provided.

In the determination result screen JS1 illustrated in FIG. 7, the cell image CI2 is designated in the thumbnail image display area LA, "Seg" is displayed in the cell type (kind) display area CTA as the subclass determined for the cell image CI2, and "2(1,1)-0.47-1.9 µm-Seg" is displayed in the parameter display area PA as the values of feature parameters P3 selected for the cell image Ci2. Note that "2(1,1)" is information on the overlap of nuclei, "0.47" indicates the minimum width of the nucleus (min)/maximum width of the nucleus (Max) ratio, and "1.9 µm" indicates the minimum width of the nucleus (min).

Thus, the user designates a particular cell image from among the cell images in the thumbnail image display area LA to display the designated particular cell image in the enlarged image display area EIA. By referring to the enlarged cell image and the values of the feature parameters displayed in association with the cell image, the user can more quickly and accurately check whether the cell determination result is appropriate.

With the above configuration, the cell image analysis apparatus 1 obtains the values of the feature parameters to be used in cell type determination for each cell image, and displays the values of the feature parameters in association with the corresponding cell image. In this way, it is possible to assist the examiner in accurately determining the types of cells.

When the user operates the tab display area TA to change the type of cells displayed in the thumbnail image display area LA, the types of parameters displayed in the parameter display area PA are changed according to the type of cells to be displayed in the thumbnail image display area LA.

With the above configuration, only the feature parameters that are useful in cell type determination can be displayed. This makes it easier for the examiner to determine the cell type.

As illustrated in FIG. 7, the cell image analysis apparatus 1 may display the values of the feature parameters in the same screen as the screen in which the cell image is displayed.

With the above configuration, the cell image analysis apparatus 1 displays the values of the feature parameters in the same screen as the screen in which the cell image is displayed. In this way, it is possible to easily figure out a particular cell image and the feature parameters associated with this cell image. It is therefore possible to further enhance the efficiency of the examiner's work for cell type determination and also further reduce the work burden on the examiner.

Figure 8:
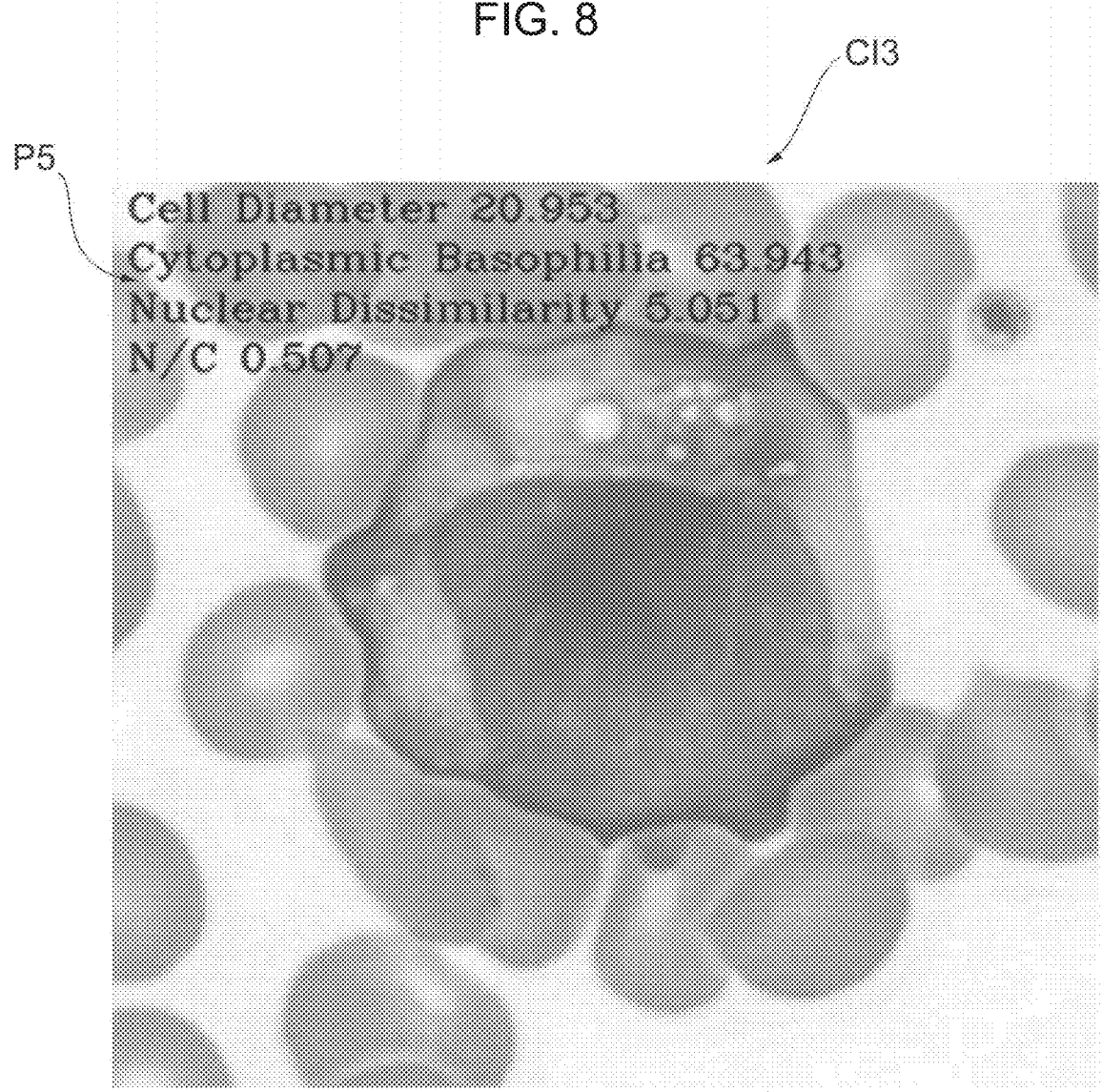
FIG. 8 is a diagram illustrating an example of a cell image including values of feature parameters of a cell according to an embodiment.

FIG. 8 is a diagram explaining an example of a cell image including the values of feature parameters of a cell according to an embodiment. As illustrated in FIG. 8, for example, in an enlarged cell image CI3 displayed in the enlarged image display area EIA of the determination result screen JS1 as illustrated in FIG. 7, the cell image analysis apparatus 1 displays "Cell Diameter 20.953 . . . N/C 0.507" as information P5 of the feature parameters selected for the enlarged cell image CI3.

With the above configuration, the cell image analysis apparatus 1 displays in a cell image the values of the feature parameters associated with this cell image. In this way, it is possible to more easily figure out a particular cell image and the values of the feature parameters associated with this cell image. It is therefore possible to further enhance the efficiency of the examiner's work for cell type determination and also further reduce the work burden on the examiner.

When displaying the values of feature parameters and a cell image in association with each other, the cell image analysis apparatus 1 may display the value of a feature parameter and identification information of this feature parameter in association with each other. For example, as illustrated in the cell image CI1 illustrated in FIG. 6, the cell image analysis apparatus 1 may display the value of a feature parameter (e.g., 1.6 µm indicating the "minimum width of the nucleus") and identification information of the "minimum width of the nucleus" ("min") in association with each other. Here, the identification information displayed in association with the cell image includes identification information corresponding to the value of the feature parameter that was the deciding factor in the classification (determination) of the cell.

With the above configuration, when displaying the values of feature parameters and a cell image in association with each other, the cell image analysis apparatus 1 displays the value of a feature parameter and identification information of this feature parameter in association with each other. Thus, the value of a particular feature parameter and the name of this feature parameter are displayed in association with each other. In this way, the examiner can easily figure out the content of the particular feature parameter.

Note that in the cell image CI1 illustrated in FIG. 6, feature parameters P1 are displayed as "0.27-1.6 μm-seg (min)", and the display position of the identification information is at the end. However, the display position of the identification information is not limited to the end. For example, the identification information may be displayed at the position immediately after "1.6 μm" indicating the "minimum width of the nucleus", like "0.27-1.6 μm-(min)-seg" or displayed at the beginning position, like "(min)-0.27-1.6 μm-seg".

An example of a cell feature parameter selection process according to an embodiment is explained with reference to FIGS. 9 to 11. FIG. 9 is a flowchart explaining an example of the cell feature parameter selection process. This process is executed before the cell classification such as when the cell image analysis apparatus 1 is installed. Alternatively, this process may be executed following the displaying of the determination result screen JS1 illustrated in FIG. 7 after the cell classification.

The selection condition receiver 115 of the cell image analysis apparatus 1 displays a feature parameter selection screen SS1/SS3 illustrated in FIGS. 10A and 10B (step S21). In step S23, the selection condition receiver 115 of the cell image analysis apparatus 1 determines whether a feature parameter selection condition has been received. The cell image analysis apparatus 1 proceeds to step S25 if a selection condition has been received (Yes). Note that in the feature parameter selection screen SS1 illustrated in FIG. 10A, three parameters CB1, CB3, and CB5 are set as default. The parameters set as default are parameters that are particularly useful in cell type determination and vary by cell type. If the user wishes to change the default setting, the user selects and switches the checkbox(es) corresponding to the feature parameter(s) to be changed. By setting feature parameters particularly useful in cell type determination as default as above, it is possible to minimize the number of feature parameter values to be displayed and enable the user to check the cell type determination faster.

In a case of executing the feature parameter selection process after displaying the determination result screen JS1 illustrated in FIG. 7, the feature parameter selection screen SS1 displaying a list of parameters as illustrated in FIG. 10A is displayed when the user presses, for example, a parameter selection button PSB provided in the operation button display area OBA in the determination result screen JS1. By checking the checkbox(es) corresponding to the feature parameter(s) the user wishes to refer to among the parameters displayed in the feature parameter selection screen SS1 and pressing an OK button B1, the user can select and set the feature parameter(s) to be displayed in association with the cell image. Also, by pressing a cancel button B3 in the feature parameter selection screen SS1, the user returns to the determination result screen JS1 illustrated in FIG. 7. Note that it is possible not to display any feature parameter values in the cell image by unchecking all checkboxes in the feature parameter selection screen SS1.

The types of parameters pre-included in the feature parameter selection screen may vary according to the result of the type determination on the cell image designated in the thumbnail image display area LA of the determination result screen JS1 illustrated in FIG. 7. In a case where cell images of, for example, lymphocytes, monocytes, eosinophils, or basophils are displayed in the form of thumbnails in the thumbnail image display area LA, a feature parameter selection screen including only parameters that are highly relevant to these cells may be displayed when the user presses the parameter selection button PSB. In this case, a feature parameter selection screen may be displayed which includes, for example, only the feature parameters excluding the "maximum width of the nucleus", the "minimum width of the nucleus", the "minimum width of the nucleus (min)/maximum width of the nucleus (Max) ratio", and the "overlap of nuclei" among the feature parameters included in the feature parameter selection screen SS1 illustrated in FIG. 10A. On the other hand, in a case where cell images of, for example, neutrophils are displayed in the form of thumbnails in the thumbnail image display area LA, a feature parameter selection screen including only parameters that are highly relevant to neutrophil may be displayed when the user presses the parameter selection button PSB. In this case, the feature parameter selection screen SS1 illustrated in FIG. 10A is displayed, for example.

In the example of the feature parameter selection screen SS1 illustrated in FIG. 10A, the checkboxes CB1, CB3 and CB5 are checked. However, as illustrated in the feature parameter selection screen SS3 illustrated in FIG. 10B, the "minimum width of the nucleus" and the "minimum width of the nucleus (min)/maximum width of the nucleus (Max) ratio" can be set as the feature parameters to be displayed in association with the cell image when the user unchecks the checkbox CB5 and presses the OK button B1.

If, on the other hand, not receiving any selection condition, that is, if not receiving any instruction from the user via the selection screen illustrated in FIGS. 10A and 10B (No in step S23), the selection condition receiver 115 of the cell image analysis apparatus 1 waits until receiving a selection condition.

The selector 113 of the cell image analysis apparatus 1 selects feature parameters based on the selection condition received via the feature parameter selection screen SS1 (step S25). In step S27, the cell image display part 112 of the cell image analysis apparatus 1 causes the display part 13 to display the information of the selected feature parameters in association with the corresponding cell image.

Figure 11:
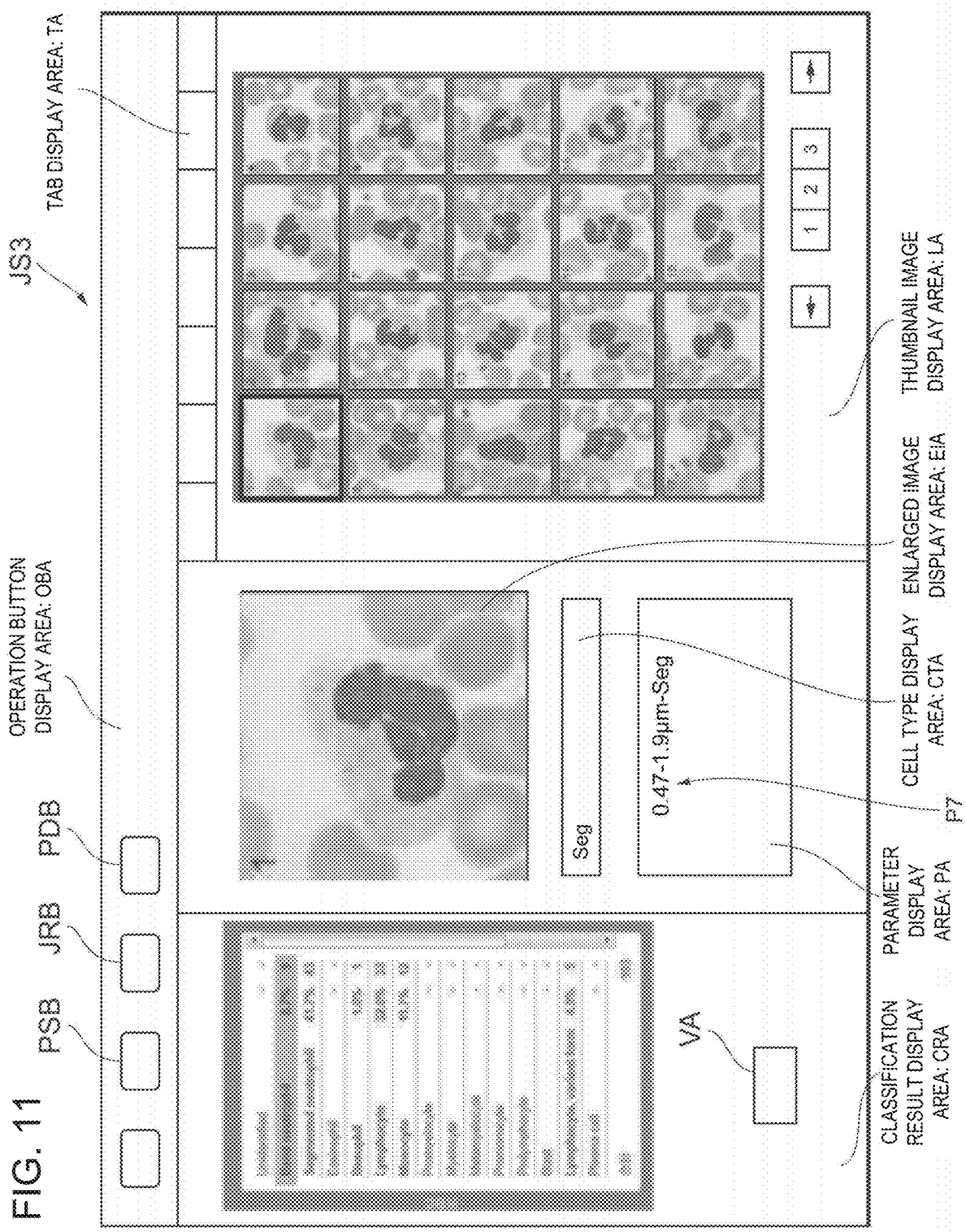
FIG. 11 is a diagram illustrating another example of a cell type determination result screen on a display part of a cell image analysis apparatus according to an embodiment.

FIG. 11 is an explanatory diagram illustrating another example of the cell type determination result screen displayed on the display part 13 of the cell image analysis apparatus 1. In the parameter display area PA of the determination result screen JS1 illustrated in FIG. 7, "2(1,1)-0.47-1.9 μm-Seg" is displayed as the feature parameters of the cell image. However, as illustrated in FIGS. 10A and 10B, the feature parameter of the "overlap of nuclei" has been removed from the feature parameters to be displayed. Thus, in the parameter display area PA of a determination result screen JS3 illustrated in FIG. 11, feature parameters P7 "0.47-1.9 μm-Seg" are displayed, in which "2(1,1)" being the parameter value corresponding to the "overlap of nuclei" is undisplayed.

As explained above, the cell image analysis apparatus 1 selects feature parameters from among the parameters of cells. It is therefore possible to enhance the efficiency of the examiner's work for cell type determination and also reduce the work burden on the examiner.

Also, the cell image analysis apparatus 1 receives a feature parameter selection condition and selects feature parameters based on the received selection condition. Thus, since feature parameters are selected based on the received selection condition, it is possible to specify the feature parameters desired by the examiner. It is therefore possible to further enhance the efficiency of the examiner's work for cell type determination and also further reduce the work burden on the examiner.

Further, the cell image analysis apparatus 1 may select feature parameters based on a predefined selection condition. For example, the feature parameter selection is not limited to the selection made according to a user operation as explained above, but may be made automatically by the cell image analysis apparatus 1. For example, for cell images classified as neutrophils, the parameters particularly useful in Band/Seg determination, i.e., the "maximum width of the nucleus", the "minimum width of the nucleus", the "minimum width of the nucleus (rain)/maximum width of the nucleus (Max) ratio", and the "overlap of nuclei", may be pre-selected (pre-set) as the feature parameters. Furthermore, only the parameter that was the deciding factor in the cell type determination may be automatically set as the feature parameter.

With the above configuration, the cell image analysis apparatus 1 selects feature parameters based on a predefined selection condition. Thus, since feature parameters are automatically selected based on a predefined selection condition, the examiner does not need to select feature parameters each time. It is therefore possible to further enhance the efficiency of the examiner's work for cell type determination and also further reduce the work burden on the examiner.

A cell type determination result changing process according to an embodiment is explained with reference to FIGS. 12 and 13. FIG. 12 is a flowchart explaining an example of the determination result changing process.

As illustrated in FIG. 12, the cell image display part 112 of the cell image analysis apparatus 1 firstly displays, for example, the determination result screen JS1 illustrated in FIG. 7, which is a prerequisite condition (step S31). As explained above, when feature parameters are selected based on a user instruction or automatically, the values of the selected feature parameters are displayed in the parameter display area PA in association with the enlarged cell image. The user designates a particular cell image from among the cell images in the thumbnail image display area LA to display the designated particular cell image in the enlarged image display area EIA. By referring to the enlarged cell image and the values of the feature parameters displayed in association with the cell image, the user can more quickly and accurately check whether the cell determination result is appropriate. Note that, in addition to the cell determination result, the analyzer 111 of the cell image analysis apparatus 1 also calculates counts each being the number of cells based on the determination result, and the cell image display part 112 displays the counts in the classification result display area CRA of the determination result screen JS1.

In step S33, the cell type receiver 119 of the cell image analysis apparatus 1 determines whether an instruction to change the determination result has been received. If the cell type receiver 119 of the cell image analysis apparatus 1 has received an instruction to change the determination result (Yes), the process proceeds to step S35.

Figure 13A:
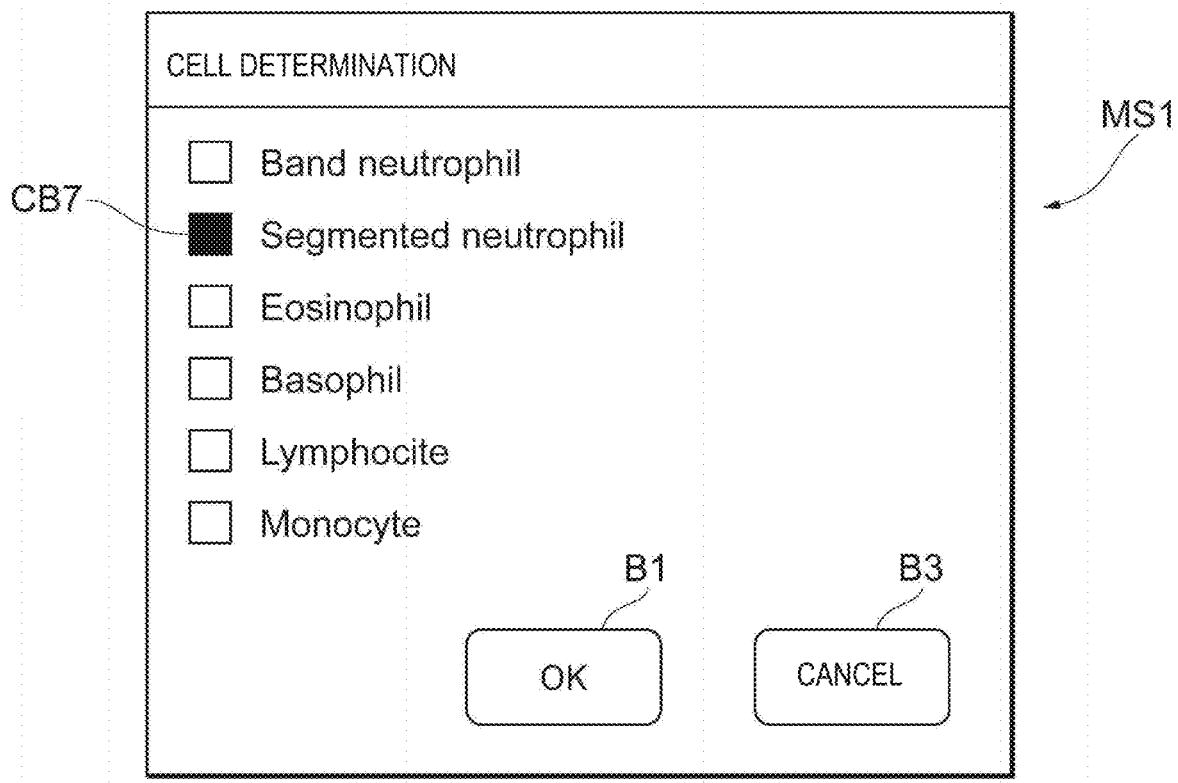
FIGS. 13A and 13B are diagrams illustrating an example of a change screen for changing a cell type determination result on a display part of a cell image analysis apparatus according to an embodiment.
Figure 13B:
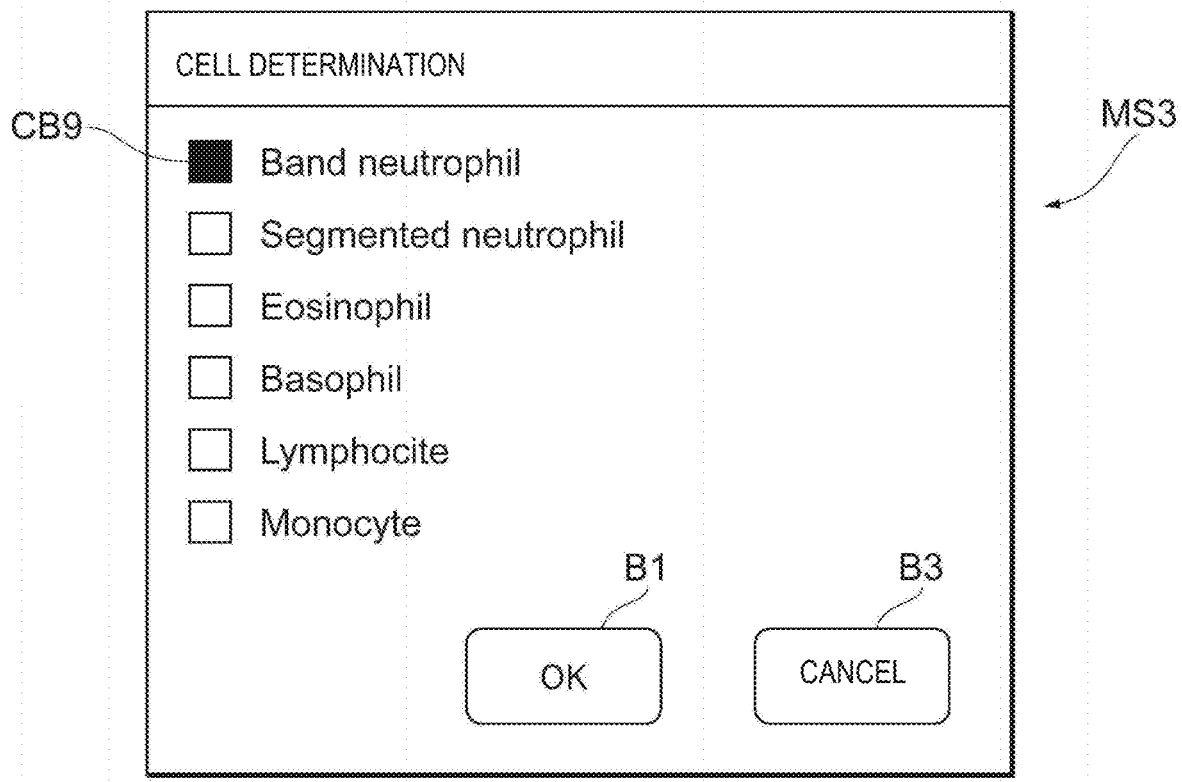

FIGS. 13A and 13B are diagrams illustrating an example of a change screen for changing a cell type determination result displayed on the display part 13 of the cell image analysis apparatus 1. If the user thinks that, for example, the cell determination result in the determination result screen JS1 illustrated in FIG. 7 is not appropriate and presses a determination result change button JRB provided in the operation button display area OBA, a determination result change screen MS1 is displayed in which a list of subclasses is displayed, as illustrated in FIG. 13A. By checking the checkbox corresponding to an appropriate subclass as the cell determination result among the subclasses displayed in the determination result change screen MS1 and pressing an OK button B1, the user can specify an appropriate classification and update the determination result. Also, by pressing a cancel button B3 in the determination result change screen MS1, the user returns to the determination result screen JS1 illustrated in FIG. 7.

In the example of the determination result change screen MS1 illustrated in FIG. 13A, a checkbox CB7 "Segmented neutrophil" is checked since the cell image designated in the determination result screen JS1 illustrated in FIG. 7 is classified as "Seg". If, however, the user makes an examination and determines that the appropriate determination result is "Band", the user unchecks the checkbox CB7 "Segmented neutrophil" in the determination result change screen MS1 and newly checks a checkbox CB9 "Band neutrophil" corresponding to "Band". Thus, the user can easily change the result of the determination made by the cell image analysis apparatus 1. Note that the user can change a cell determination result multiple times.

In step S35, the counter 121 of the cell image analysis apparatus 1 counts the number of cells again according to the change in the cell determination result. If the cell determination result is changed multiple times in step S33, the number of cells may be counted each time the determination result is changed or the number of cells may be counted each time the determination result is changed a predetermined number of times. In step S37, the cell image display part 112 of the cell image analysis apparatus 1 updates the determination result screen according to the change in the cell determination result. In the case of the above example, the cell image display part 112 of the cell image analysis apparatus 1 updates the determination result screen JS1 illustrated in FIG. 7 so as to, for example, change the display "Seg" in the cell type display area CTA of the determination result screen JS1 to "Band" and change the count values displayed in the classification result display area CRA.

If, on the other hand, the cell type receiver 119 of the cell image analysis apparatus 1 has not received any instruction to change the determination result in step S33 (No), the process proceeds to step S39. In step S39, the cell type receiver 119 of the cell image analysis apparatus 1 determines whether an instruction to confirm the determination result has been received. The process proceeds to step S41 if the cell type receiver 119 of the cell image analysis apparatus 1 has received an instruction to confirm the determination result (Yes), e.g., if the user has pressed a determination result confirmation button VA in the determination result screen JS1 illustrated in FIG. 7. In step S41, the transmitter 122 of the cell image analysis apparatus 1 transmits the count value corresponding to the confirmed determination result to the host computer. If, on the other hand, the cell type receiver 119 of the cell image analysis apparatus 1 has not received any instruction to confirm the determination result in step S39 (No), the process returns to step S33.

With the above configuration, the cell image analysis apparatus 1 receives an input of the type of the cell included in the displayed cell image, and counts the number of cells by cell type based on the received cell type. Thus, the examiner can appropriately change the cell determination result.

An example of a cell feature parameter display control process according to an embodiment is explained with reference to FIG. 14. FIG. 14 is a flowchart explaining an example of the cell feature parameter display control process according to an embodiment.

As illustrated in FIG. 14, the cell image display part 112 of the cell image analysis apparatus 1 displays, for example, the determination result screen JS1 illustrated in FIG. 7, which is a prerequisite condition (step S51). In step S53, the determination part 117 of the cell image analysis apparatus 1 determines whether an instruction to control the display of the feature parameters has been received. If the determination part 117 of the cell image analysis apparatus 1 has received an instruction to control of the display of the feature parameters (Yes), the process proceeds to step S55. In step S55, the determination part 117 of the cell image analysis apparatus 1 determines whether to display the parameters according to the content of the received parameter display control instruction from the user. For example, if the user presses a parameter display control button PDB provided in the operation button display area OBA in the determination result screen JS1 illustrated in FIG. 7, the determination part 117 of the cell image analysis apparatus 1 determines whether to display or not to display the values of the feature parameters in the determination result screen JS1 collectively for all cell images. Alternatively, the determination part 117 of the cell image analysis apparatus 1 may determine whether to display or not to display the values of the feature parameters in the determination result screen JS1 individually for each cell image. If, on the other hand, the determination part 117 of the cell image analysis apparatus 1 has not received any instruction to control the display of the feature parameters in step S53 (No), the determination part 117 waits until receiving an instruction.

With the above configuration, the cell image analysis apparatus 1 determines whether to display the information of the feature parameters based on an instruction from the user. In this way, the examiner can freely control whether to display the information of the feature parameters in association with the cell image. This improves the convenience for the examiner in making a cell type determination.

<Other Embodiments>

The above embodiments are intended to facilitate understanding of the present invention and not intended to interpret the present invention in a limited manner. Changes and modifications (e.g., combining embodiments and omitting part of the configurations in embodiments) can be made to the present invention without departing from the gist thereof, and the present invention includes equivalents thereof.

Figure 15:
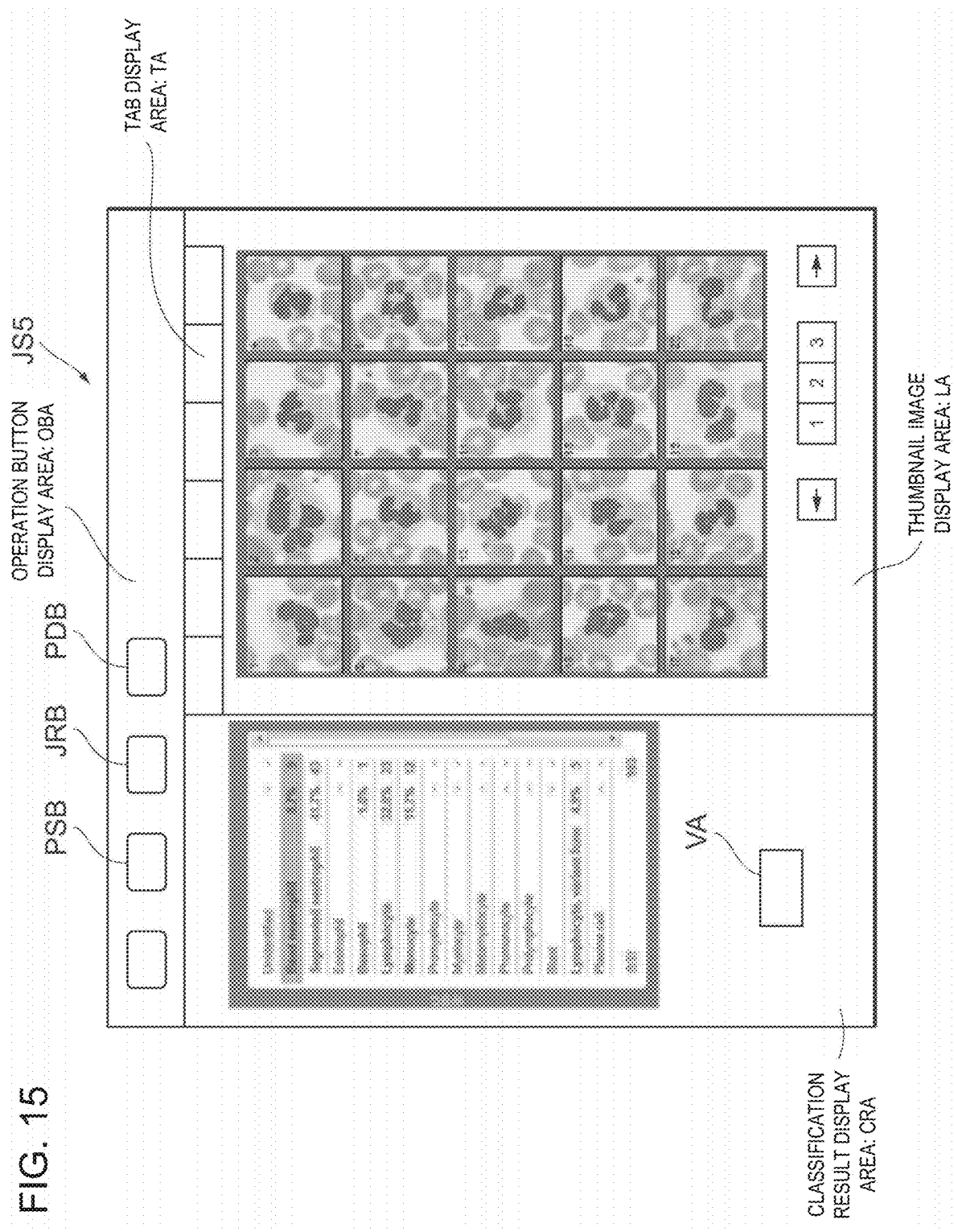
FIG. 15 is a diagram illustrating another example of a cell type determination result screen on a display part of a cell image analysis apparatus according to an embodiment.

FIG. 15 is a diagram illustrating another example of the cell type determination result screen on the display part of the cell image analysis apparatus according to an embodiment. Unlike the determination result screens JS1 and JS3 illustrated in FIGS. 7 and 11, a determination result screen JS5 illustrated in FIG. 15 includes none of the enlarged image display area EIA, the cell type display area CTA, and the parameter display area PA, which are provided in center screen portions of the determination result screens JS1 and JS3. Thus, without the enlarged image display area EIA, the cell type display area CTA, and the parameter display area PA, the cell images to be displayed in the thumbnail image display area LIA can be displayed larger than those in the determination result screens JS1 and JS3. When the user selects one of the cell images displayed in the thumbnail image display area LA, a separate screen including the enlarged image display area EIA, the cell type display area CTA, and the parameter display area PA is displayed.

With the above configuration, the cell determination (classification) result is displayed near and together with the cell images, and the cell images are displayed larger. This makes it easier to visually recognize the cell images and the values of the parameters and therefore makes it possible to perform the cell type checking and reclassifying work more quickly.

Figure 16:
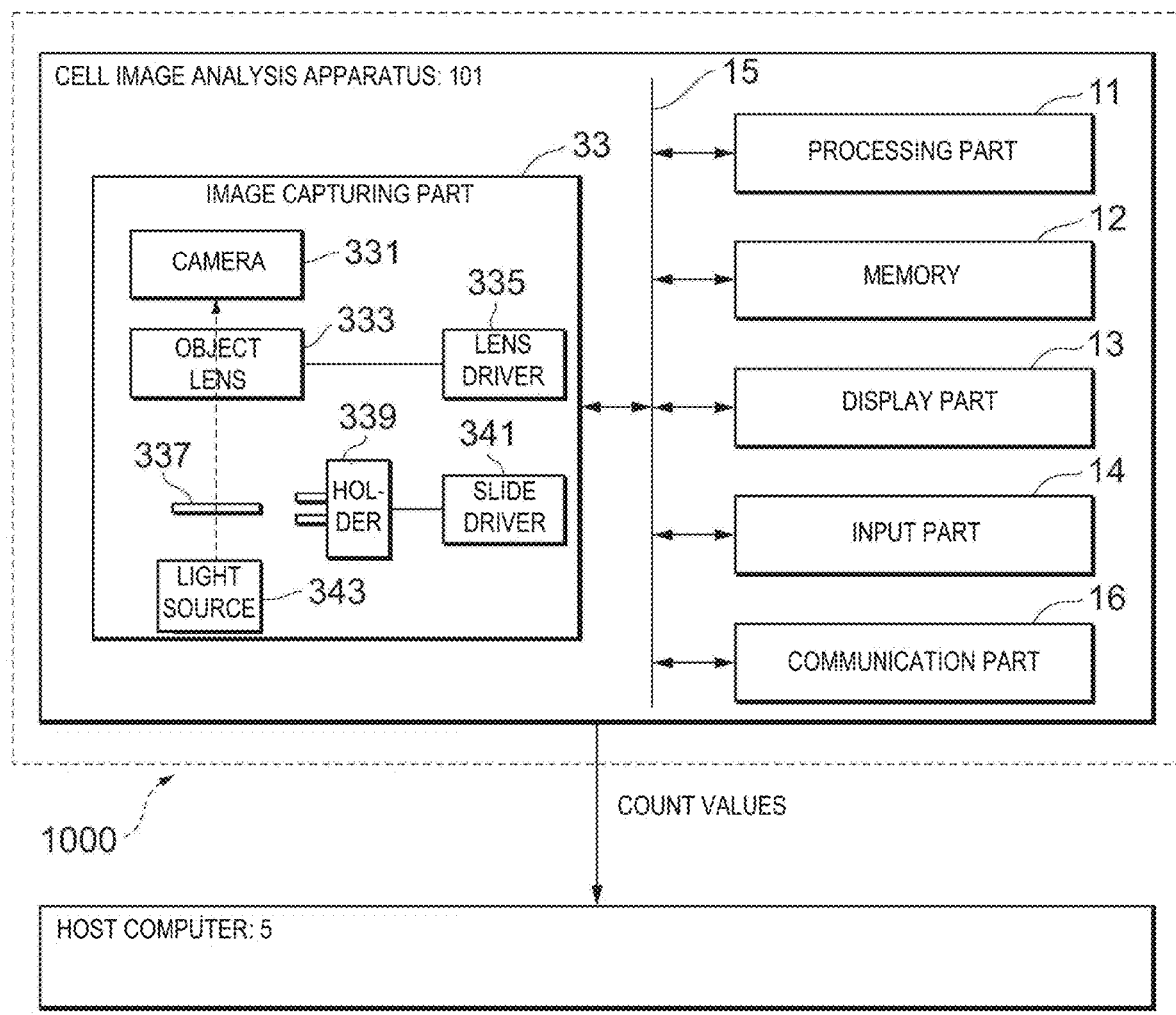
FIG. 16 is a diagram illustrating another example of the configuration of a cell image analysis system according to an embodiment.

FIG. 16 is a diagram illustrating another example of the configuration of the cell image analysis system according to an embodiment. In a cell image analysis system 1000 illustrated in FIG. 16, the cell image analysis apparatus 1 and the cell image capturing apparatus 3, which are separate components in the cell image analysis system 100 illustrated in FIG. 1, are configured to be integrated with each other. For example, as illustrated in FIG. 16, a cell image analysis apparatus 101 includes as its hardware components: an image capturing part 33 that obtains cell images; a processing part 11 that controls the operation of the image capturing part 33 and analyzes the cell images; a memory 12 that stores the results of the analyses by the processing part 11 and the cell images; a display part 13 that includes a display or the like and displays the analysis results; and an input part 14 including a mouse, a keyboard, a touchscreen device, and/or the like. The processing part 11 has the functions explained with reference to FIG. 2B and additionally the function of controlling the image capturing part 33 included in the processing part 31 explained with reference to FIG. 2A.

Also, the above embodiments have been explained such that the cell image analysis system 100 executes a two-step determination process including a primary determination and a secondary determination as the cell type determination process. However, the cell type determination process is not limited to this form, and may include a determination process with three or more steps or may include only a single determination process.

The invention claimed is:

1. A cell image analysis method comprising:
   obtaining, for each of cell images, values of a plurality of types of feature parameters to be used in determination of a type of a cell, by analyzing the cell images;
   determining, for each of the cell images, a type of cell by using the values of the plurality of types of feature parameters;
   selecting the feature parameter from among the plurality of types of the feature parameters; and
   displaying one of the cell images in association with the value of the selected feature parameter obtained from the one of the cell images and the type of cell in the one of the cell images.

2. The cell image analysis method according to claim 1, further comprising
   receiving a selection condition for the feature parameter, wherein
   the selecting comprises selecting the feature parameter based on the received selection condition.

3. The cell image analysis method according to claim 1, wherein
   the selecting comprises selecting the feature parameter based on a predefined selection condition.

4. The cell image analysis method according to claim 3, wherein
   the predefined selection condition is a condition for selecting the feature parameter based on which the type of the cell is determined in the determining.

5. The cell image analysis method according to claim 1, wherein
the feature parameter to be displayed in the displaying has been set in advance.

6. The cell image analysis method according to claim 5, wherein
the feature parameter set in advance varies by cell type.

7. The cell image analysis method according to claim 1, wherein
the displaying comprises displaying the value of the feature parameter in a same screen as a screen in which the cell image is displayed.

8. The cell image analysis method according to claim 1, further comprising
determining whether to display the value of the feature parameter based on an instruction from a user.

9. The cell image analysis method according to claim 1, wherein
the displaying comprises displaying one of the cell images in association with the value of the feature parameter obtained from the one of the cell images, identification information of the feature parameter, and the type of cell in the one of the cell images.

10. The cell image analysis method according to claim 1, wherein
the feature parameter comprises at least one of a diameter of the cell, a form of a nucleus of the cell, a diameter of the nucleus, a chromatin structure of the nucleus; a nucleolus of the cell, a color tone of a cytoplasm of the cell, a color tone distribution of the cytoplasm, a granule in the cytoplasm, a vacuole in the cytoplasm, a Döhle body in the cytoplasm, or a nuclear-cytoplasmic ratio of the cell.

11. The cell image analysis method according to claim 1, further comprising counting a number of cells by the cell type based on the cell type for each of the cell images determined in the determining.

12. The cell image analysis method according to claim 1, further comprising:
receiving an input of a change instruction of the type of cell in the one of the cell images; and
re-counting the number of cells by the cell type based on the received change instruction.

13. A cell image analysis apparatus comprising:
a display; and
a controller configured to perform operations comprising:
obtaining, for each of the cell images, values of a plurality of types of feature parameters to be used in determination of a type of a cell, by analyzing the cell images;
determining, for each of the cell images, a type of cell by using the values of the plurality of types of feature parameters;
selecting the feature parameter from among the plurality of types of the feature parameters; and
displaying, on the display, one of the cell images in association with the value of the feature parameter obtained from the one of the cell images and the type of cell in the one of the cell images.

14. The cell image analysis apparatus according to claim 13, wherein
the controller is configured to perform operations further comprising receiving a selection condition for the feature parameter, and
the selecting comprises selecting the feature parameter based on the received selection condition.

15. The cell image analysis apparatus according to claim 13, wherein the selecting comprises selecting the feature parameter based on a predefined selection condition.

16. The cell image analysis apparatus according to claim 15, wherein the predefined selection condition is a condition for selecting the feature parameter based on which the type of the cell is determined in the determining.

17. The cell image analysis apparatus according to claim 13, wherein the feature parameter to be displayed on the display has been set in advance.

18. A non-transitory computer-readable storage medium storing a program, which when read and executed, causes a computer apparatus to perform operations comprising:
obtaining, for each of cell images, values of a plurality of types of feature parameters to be used in determination of a type of a cell, by analyzing the cell images;
determining, for each of the cell images, a type of cell by using the values of the plurality of types of feature parameters;
selecting the feature parameter from among the plurality of types of the feature parameters; and
displaying one of the cell images in association with the value of the feature parameter obtained from the one of the cell images and the type of cell in the one of the cell images.

19. A cell image analysis system comprising:
a cell image capturing apparatus that captures an image of cells and obtains cell images; and
a cell image analysis apparatus that analyzes the cell images, wherein
the cell image capturing apparatus comprises:
an image capturing part that captures the image of the cells and obtains the cell images; and
a first communication part that transmits the obtained cell images to the cell image analysis apparatus, and
the cell image analysis apparatus comprises:
a second communication part that receives the cell images transmitted from the cell image capturing apparatus;
a display; and
a controller configured to
obtain, for each of the cell images, values of a plurality of types of feature parameters to be used in determination of a type of a cell, by analyzing the cell images;
determine, for each of the cell images, a type of cell by using the values of the plurality of types of feature parameters; and
display, on the display, one of the cell images in association with the value of the feature parameter obtained from the one of the cell images and the type of cell in the one of the cell images.

* * * * *